United States Patent
Sadiq et al.

(10) Patent No.: US 10,320,553 B2
(45) Date of Patent: Jun. 11, 2019

(54) COMMUNICATING INFORMATION PLUS AN INDICATION OF TRANSMISSION TIME

(71) Applicant: QUALCOMM Incorporated, San Diego, CA (US)

(72) Inventors: Bilal Sadiq, Basking Ridge, NJ (US); Juergen Cezanne, Ocean Township, NJ (US); Tao Luo, San Diego, CA (US)

(73) Assignee: QUALCOMM Incoporated, San Diego, CA (US)

( * ) Notice: Subject to any disclaimer, the term of this patent is extended or adjusted under 35 U.S.C. 154(b) by 84 days.

(21) Appl. No.: 15/603,372

(22) Filed: May 23, 2017

(65) Prior Publication Data
US 2018/0083767 A1   Mar. 22, 2018

Related U.S. Application Data

(60) Provisional application No. 62/397,831, filed on Sep. 21, 2016.

(51) Int. Cl.
*H04K 1/10* (2006.01)
*H04L 7/04* (2006.01)
(Continued)

(52) U.S. Cl.
CPC .............. *H04L 7/048* (2013.01); *H04L 1/004* (2013.01); *H04L 1/0041* (2013.01);
(Continued)

(58) Field of Classification Search
CPC ....... H04L 7/048; H04L 1/004; H04L 1/0041; H04L 1/0045; H04L 1/0061; H04L 7/10
(Continued)

(56) References Cited

U.S. PATENT DOCUMENTS

2011/0080975 A1   4/2011   Toda et al.
2013/0136296 A1   5/2013   Nakagata et al.
(Continued)

FOREIGN PATENT DOCUMENTS

WO    WO-2015149878 A1    10/2015

OTHER PUBLICATIONS

ISA/EP, International Search Report and Written Opinion of the International Searching Authority, Int'l Application No. PCT/US2017/051583, dated Feb. 13, 2018, European Patent Office, Rijswijk, NL, 20 pgs.

(Continued)

*Primary Examiner* — Zewdu A Kassa
(74) *Attorney, Agent, or Firm* — Holland & Hart LLP

(57) ABSTRACT

Methods, systems, and devices for wireless communication are described. A base station may identify a transport block for transmission that includes an information component and an error detection code. The base station may transmit a first encoded message during a first transmission time. The first encoded message may be obtained by encoding the transport block cyclically shifted a first bit length. The base station may transmit a second encoded message during a second transmission time. The second encoded message may be obtained by encoding the transport block cyclically shifted a second bit length. The relative time distance between the first and second transmission times may convey an indication of the difference between the first bit length and the second bit length.

28 Claims, 19 Drawing Sheets

(51) Int. Cl.
*H04L 7/10* (2006.01)
*H04L 1/00* (2006.01)

(52) U.S. Cl.
CPC .......... *H04L 1/0045* (2013.01); *H04L 1/0061* (2013.01); *H04L 7/10* (2013.01)

(58) Field of Classification Search
USPC .......................... 375/260, 259, 316, 295, 219
See application file for complete search history.

(56) References Cited

U.S. PATENT DOCUMENTS

2013/0262953 A1* 10/2013 Deng ................. G06F 11/1004
714/752
2015/0341956 A1* 11/2015 Sun ...................... H04L 1/0046
370/329
2015/0358998 A1* 12/2015 Golitschek Edler Von
Elbwart ............... H04W 48/16
370/280

OTHER PUBLICATIONS

ISA/EPO, Partial International Search Report of the International Searching Authority, Int'l App. No. PCT/US2017/051583, dated Nov. 15, 2017, European Patent Office, Rijswijk, NL, 14 pgs.

\* cited by examiner

US 10,320,553 B2

COMMUNICATING INFORMATION PLUS AN INDICATION OF TRANSMISSION TIME

CROSS REFERENCES

The present Application for Patent claims priority to U.S. Provisional Patent Application No. 62/397,831 by Sadiq, et al., entitled "Commuting Information Plus An Indication of Transmission Time," filed Sep. 21, 2016, assigned to the assignee hereof.

INTRODUCTION

The following relates generally to wireless communication, and more specifically to communicating information plus an indication of transmission time.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communication system may include a number of base stations, each simultaneously supporting communication for multiple communication devices, which may be otherwise known as user equipment (UE).

Wireless communication systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed.

Wireless communication systems may use synchronization procedures to support initial UE synchronization of system information, system timing, etc. For example, a node, such as a base station, may be configured to transmit system information together with an indication of time, such as an OFDM symbol index or system subframe number. An example solution may be the base station encoding and transmitting the system information and the timing information separately. This solution, however, is an inefficient use of system and over-the-air resources. Another solution is for the base station to encode and transmit the system information and the timing information together. This solution, however, creates an impractical implementation at the receiver because the receiver may not support combining multiple transmissions, even when the system information is the same across each transmission.

SUMMARY

A method of wireless communication is described. The method may include identifying a transport block for transmission comprising an information component and an error detection code, transmitting a first encoded message during a first transmission time, the first encoded message obtained by encoding the transport block cyclically shifted a first bit length, and transmitting a second encoded message during a second transmission time, the second encoded message obtained by encoding the transport block cyclically shifted a second bit length, wherein a relative time distance between the first transmission time and the second transmission time conveys an indication of the difference between the first bit length and the second bit length.

An apparatus for wireless communication is described. The apparatus may include means for identifying a transport block for transmission comprising an information component and an error detection code, means for transmitting a first encoded message during a first transmission time, the first encoded message obtained by encoding the transport block cyclically shifted a first bit length, and means for transmitting a second encoded message during a second transmission time, the second encoded message obtained by encoding the transport block cyclically shifted a second bit length, wherein a relative time distance between the first transmission time and the second transmission time conveys an indication of the difference between the first bit length and the second bit length.

Another apparatus for wireless communication is described. The apparatus may include a processor, memory in electronic communication with the processor, and instructions stored in the memory. The instructions may be operable to cause the processor to identify a transport block for transmission comprising an information component and an error detection code, transmit a first encoded message during a first transmission time, the first encoded message obtained by encoding the transport block cyclically shifted a first bit length, and transmit a second encoded message during a second transmission time, the second encoded message obtained by encoding the transport block cyclically shifted a second bit length, wherein a relative time distance between the first transmission time and the second transmission time conveys an indication of the difference between the first bit length and the second bit length.

A non-transitory computer readable medium for wireless communication is described. The non-transitory computer-readable medium may include instructions operable to cause a processor to identify a transport block for transmission comprising an information component and an error detection code, transmit a first encoded message during a first transmission time, the first encoded message obtained by encoding the transport block cyclically shifted a first bit length, and transmit a second encoded message during a second transmission time, the second encoded message obtained by encoding the transport block cyclically shifted a second bit length, wherein a relative time distance between the first transmission time and the second transmission time conveys an indication of the difference between the first bit length and the second bit length.

Some examples of the method, apparatus, and non-transitory computer-readable medium described above may further include processes, features, means, or instructions for selecting the first bit length may be based at least in part on the first transmission time. Some examples of the method, apparatus, and non-transitory computer-readable medium described above may further include processes, features, means, or instructions for selecting the second bit length may be based at least in part on the second transmission time.

Some examples of the method, apparatus, and non-transitory computer-readable medium described above may further include processes, features, means, or instructions for cyclically shifting the transport block. Some examples of the method, apparatus, and non-transitory computer-readable medium described above may further include processes, features, means, or instructions for encoding the cyclically shifted transport block using a cyclic code.

Some examples of the method, apparatus, and non-transitory computer-readable medium described above may further include processes, features, means, or instructions for encoding the transport block using a cyclic code. Some examples of the method, apparatus, and non-transitory computer-readable medium described above may further include processes, features, means, or instructions for cyclically shifting the encoded transport block.

Some examples of the method, apparatus, and non-transitory computer-readable medium described above may further include processes, features, means, or instructions for performing an error detection procedure on the transport block that may have been cyclically shifted one or more other bit lengths. Some examples of the method, apparatus, and non-transitory computer-readable medium described above may further include processes, features, means, or instructions for adjusting one or more reserved bits of the transport block until the error detection procedure fails for each of the one or more other bit lengths.

In some examples of the method, apparatus, and non-transitory computer-readable medium described above, the one or more other bit lengths may be associated with other available transmission times. In some examples of the method, apparatus, and non-transitory computer-readable medium described above, the information component comprises a system information component. In some examples of the method, apparatus, and non-transitory computer-readable medium described above, the transmission time comprises at least one of a symbol index or a subframe number. In some examples of the method, apparatus, and non-transitory computer-readable medium described above, the error detection code comprises a cyclic redundancy code.

In some examples of the method, apparatus, and non-transitory computer-readable medium described above, the cyclically shifted first bit length and the cyclically shifted second bit length are shifted according to a circular shifting scheme. In some examples of the method, apparatus, and non-transitory computer-readable medium described above, the cyclically shifted first bit length conveys an indication of a first redundancy version index associated with the first encoded message, and the cyclically shifted second bit length conveys an indication of a second redundancy version index associated with the second encoded message.

A method of wireless communication is described. The method may include receiving a first encoded message during a first transmission time, the first encoded message comprising a transport block cyclically shifted a first bit length, receiving a second encoded message during a second transmission time, the second encoded message comprising the transport block cyclically shifted a second bit length, identifying a relative time distance between the first transmission time and the second transmission time, and identifying the difference between the first bit length and the second bit length based at least in part on the identified relative time distance.

An apparatus for wireless communication is described. The apparatus may include means for receiving a first encoded message during a first transmission time, the first encoded message comprising a transport block cyclically shifted a first bit length, means for receiving a second encoded message during a second transmission time, the second encoded message comprising the transport block cyclically shifted a second bit length, means for identifying a relative time distance between the first transmission time and the second transmission time, and means for identifying the difference between the first bit length and the second bit length based at least in part on the identified relative time distance.

Another apparatus for wireless communication is described. The apparatus may include a processor, memory in electronic communication with the processor, and instructions stored in the memory. The instructions may be operable to cause the processor to receive a first encoded message during a first transmission time, the first encoded message comprising a transport block cyclically shifted a first bit length, receive a second encoded message during a second transmission time, the second encoded message comprising the transport block cyclically shifted a second bit length, identify a relative time distance between the first transmission time and the second transmission time, and identify the difference between the first bit length and the second bit length based at least in part on the identified relative time distance.

A non-transitory computer readable medium for wireless communication is described. The non-transitory computer-readable medium may include instructions operable to cause a processor to receive a first encoded message during a first transmission time, the first encoded message comprising a transport block cyclically shifted a first bit length, receive a second encoded message during a second transmission time, the second encoded message comprising the transport block cyclically shifted a second bit length, identify a relative time distance between the first transmission time and the second transmission time, and identify the difference between the first bit length and the second bit length based at least in part on the identified relative time distance.

Some examples of the method, apparatus, and non-transitory computer-readable medium described above may further include processes, features, means, or instructions for aligning an encoded transport block of the first message with an encoded transport block of the second message using the identified difference between the first bit length and the second bit length. Some examples of the method, apparatus, and non-transitory computer-readable medium described above may further include processes, features, means, or instructions for decoding the bit aligned encoded transport blocks.

Some examples of the method, apparatus, and non-transitory computer-readable medium described above may further include processes, features, means, or instructions for aligning the encoded transport block of the first message with the encoded transport block of the second message comprises removing a relative cyclic shift between the encoded transport blocks.

Some examples of the method, apparatus, and non-transitory computer-readable medium described above may further include processes, features, means, or instructions for aligning decision metrics associated with an encoded transport block of the first message with decision metrics associated with an encoded transport block of the second message using the identified difference between the first bit length and the second bit length. Some examples of the method, apparatus, and non-transitory computer-readable medium described above may further include processes, features, means, or instructions for combining the aligned one or more decision metrics. Some examples of the method, apparatus, and non-transitory computer-readable medium described above may further include processes, features, means, or instructions for decoding the combined decision metrics to obtain a decoded transport block.

Some examples of the method, apparatus, and non-transitory computer-readable medium described above may further include processes, features, means, or instructions for determining that one or more bits of the transport block of the second message may be different from the corresponding bits of the transport block of the first message.

In some examples of the method, apparatus, and non-transitory computer-readable medium described above, the one or more bits may be located at a preconfigured location of the transport block.

In some examples of the method, apparatus, and non-transitory computer-readable medium described above, the transport block comprises a system information transport block.

In some examples of the method, apparatus, and non-transitory computer-readable medium described above, a transmission time comprises at least one of a symbol index or a subframe number.

Some examples of the method, apparatus, and non-transitory computer-readable medium described above may further include processes, features, means, or instructions for performing an error detection procedure on the transport block using one or more other cyclic shift bit lengths. Some examples of the method, apparatus, and non-transitory computer-readable medium described above may further include processes, features, means, or instructions for identifying a transmission time associated with the first encoded message based at least in part on the error detection procedure passing for the first bit length.

In some examples of the method, apparatus, and non-transitory computer-readable medium described above, the error detection code comprises a cyclic redundancy code.

A method of wireless communication is described. The method may include obtaining a decoded transport block that is cyclically shifted a first bit length, the transport block comprising an information component and an error detection code, performing an error detection procedure on the transport block by reverse cyclically shifting the transport block for each of one or more other bit lengths, and identifying the first bit length based at least in part on the error detection procedure passing for the first bit length.

An apparatus for wireless communication is described. The apparatus may include means for obtaining a decoded transport block that is cyclically shifted a first bit length, the transport block comprising an information component and an error detection code, means for performing an error detection procedure on the transport block by reverse cyclically shifting the transport block for each of one or more other bit lengths, and means for identifying the first bit length based at least in part on the error detection procedure passing for the first bit length.

Another apparatus for wireless communication is described. The apparatus may include a processor, memory in electronic communication with the processor, and instructions stored in the memory. The instructions may be operable to cause the processor to obtain a decoded transport block that is cyclically shifted a first bit length, the transport block comprising an information component and an error detection code, perform an error detection procedure on the transport block by reverse cyclically shifting the transport block for each of one or more other bit lengths, and identify the first bit length based at least in part on the error detection procedure passing for the first bit length.

A non-transitory computer readable medium for wireless communication is described. The non-transitory computer-readable medium may include instructions operable to cause a processor to obtain a decoded transport block that is cyclically shifted a first bit length, the transport block comprising an information component and an error detection code, perform an error detection procedure on the transport block by reverse cyclically shifting the transport block for each of one or more other bit lengths, and identify the first bit length based at least in part on the error detection procedure passing for the first bit length.

Some examples of the method, apparatus, and non-transitory computer-readable medium described above may further include processes, features, means, or instructions for using the identified first bit length to determine an associated transmission time.

In some examples of the method, apparatus, and non-transitory computer-readable medium described above, the error detection procedure comprises at least one of reverse-permuting the error detection code, de-interleaving the error detection code, or descrambling the error detection code.

Some examples of the method, apparatus, and non-transitory computer-readable medium described above may further include processes, features, means, or instructions for determining that the error detection procedure passes for at least two of the one or more other bit lengths.

Some examples of the method, apparatus, and non-transitory computer-readable medium described above may further include processes, features, means, or instructions for discarding the decoded transport block.

Some examples of the method, apparatus, and non-transitory computer-readable medium described above may further include processes, features, means, or instructions for identifying the at least two of the one or more other bit lengths as candidate bit lengths. Some examples of the method, apparatus, and non-transitory computer-readable medium described above may further include processes, features, means, or instructions for accessing preconfigured information to identify the first bit length from the candidate bit lengths.

DETAILED DESCRIPTION

Figure 1:
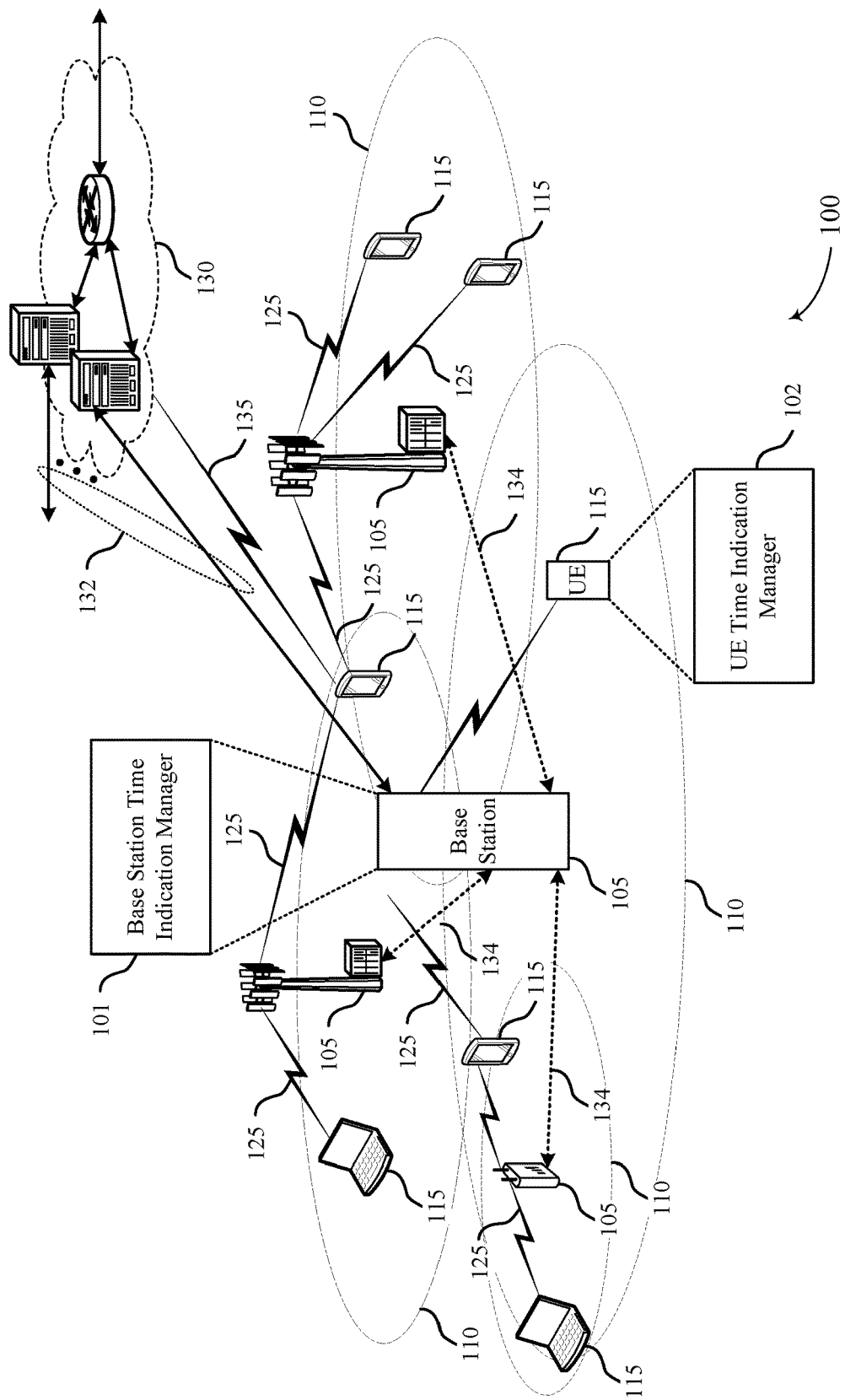
FIG. 1 illustrates an example of a system for wireless communication that supports communicating information plus an indication of transmission time, in accordance with one or more aspects of the present disclosure.

Aspects of the disclosure are initially described in the context of a wireless communication system. Generally, the described techniques provide for transmitting information, such as system information, that includes an indication of time, such as an OFDM symbol index or subframe number. The described techniques provide for a receiver to efficiently combine multiple transmission for improved decoding and determination of the timing information. In one non-limiting example, a base station, such as a mmW base station, may utilize the described techniques to transmit the same system information in a beam sweeping manner (e.g., the same system information may be transmitted in different beam-formed directions) in different transmission times (e.g., in every OFDM symbol of a synchronization subframe).

A base station may prepare a transport block (TB) for transmission that includes an information component and an error detection code. The base station may generate a first encoded message by cyclically shifting the TB (also referred to as circular shifting the TB) a first bit length and then encoding the shifted TB or by encoding the TB and then cyclically shifting the encoded TB by the first bit length. The base station may use a cyclic code to encode the TB. The base station may transmit the first encoded message during a first transmission time. The base station may generate a second encoded message by cyclically (e.g., circularly) shifting the TB a second bit length and then encoding the shifted TB or by encoding the TB and then cyclically (e.g., circularly) shifting the encoded TB by the second bit length. The base station may use the cyclic code to encode the TB. The base station may transmit the second encoded message during a second transmission time. The first bit length and the second bit length may be based on the first and second transmission times, respectively. Thus, the base station may transmit different redundancy versions (RVs) for each synchronization signal block index, e.g., created by cyclically (e.g., circularly) shifting the codeword. A receiver, such as a UE, may receive the first and second encoded messages and identify a relative time distance (or difference) between the first transmission and the second transmission. The UE may use the relative time distance to identify the difference between the first bit length and the second bit length.

Additionally or alternatively, the described techniques may support a receiving device, such as a UE, identifying the first bit length of the cyclically (e.g., circularly) shifted TB and the associated transmission time based on receiving one encoded message. For example, the UE may obtain a decoded TB that has been cyclically (e.g., circularly) shifted by the first bit length. The UE may perform an error detection procedure, such as a cyclic redundancy check or a modified cyclic redundancy check, on the TB by reverse cyclically shifting the TB for each of one or more other bit lengths, e.g., each of a plurality of bit lengths that are associated with different available transmission times. The UE may identify the first bit length based on the error detection procedure passing for the first bit length. For example, the error detection code of the TB may be modified (e.g., permuted, interleaved, scrambled, etc.) such that the error detection procedure only passes for a cyclic shift that corresponds to the first bit length.

Aspects of the disclosure are further illustrated by and described with reference to apparatus diagrams, system diagrams, and flowcharts that relate to communicating information plus an indication of transmission time.

FIG. 1 illustrates an example of a wireless communication system 100, in accordance with one or more aspects of the present disclosure. The wireless communication system 100 may include base stations 105 (e.g., gNodeBs (gNBs), and/or radio heads (RHs)), UEs 115, and a core network 130. Wireless communication system 100 may support dynamic reception opportunity (RO) and transmit opportunity (TO) configurations to enable reduced latency and reduced power consumption. For example, wireless communication system 100 may support a TO following the reception of data during the on duration of a discontinuous reception (DRX) configuration. Additionally or alternatively, a subsequent RO may follow the transmission of data during the on duration of a discontinuous transmission (DTX) configuration.

The core network 130 may provide user authentication, access authorization, tracking, Internet Protocol (IP) connectivity, and other access, routing, or mobility functions. At least some of the base stations 105 (e.g., eNodeBs (eNBs), network access devices, gNBs, access node controller (ANC)) may interface with the core network 130 through backhaul links 132 (e.g., S1, S2, etc.) and may perform radio configuration and scheduling for communication with the UEs 115. In various examples, the base stations 105 may communicate, either directly or indirectly (e.g., through core network 130), with each other over backhaul links 134 (e.g., X1, X2, etc.), which may be wired or wireless communication links.

Each base station 105 may also communicate with a number of UEs 115 through a number of other base stations 105, where base station 105 may be an example of a smart radio head. In alternative configurations, various functions of each base station 105 may be distributed across various base stations 105 (e.g., radio heads and access network controllers) or consolidated into a single base station 105. A UE 115 may communicate with a core network 130 through communication link 135.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a base station 105, or core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, a wireless node, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an internet of everything (IoE) device, or the like. A UE 115 may be able to communicate with various types of base stations, access points, or other network devices, including macro eNBs, small cell eNBs, relay base stations, gNBs, and the like. A UE 115 may also be able to communicate directly with other UEs (e.g., using a peer-to-peer (P2P) protocol).

The communication links 125 shown in wireless communication system 100 may include uplink (UL) channels from a UE 115 to a base station 105, and/or DL channels, from a base station 105 to a UE 115. The downlink channels may also be called forward link channels, while the uplink channels may also be called reverse link channels. Control information and data may be multiplexed on an uplink channel or downlink according to various techniques. Control information and data may be multiplexed on a downlink channel, for example, using time-division multiplexing (TDM) techniques, frequency-division multiplexing (FDM) techniques, or hybrid TDM-FDM techniques. In some examples, the control information transmitted during a transmit time interval (TTI) of a downlink channel may be distributed between different control regions in a cascaded manner (e.g., between a common control region and one or more UE-specific control regions).

A UE 115 attempting to access a base station 105 may perform an initial cell search by detecting a synchronization signal from a base station 105. The synchronization signal may indicate system information and enable synchronization of timing and may indicate an identity value of the base station 105. The UE 115 may receive a second synchronization signal that also indicates the system information and enables synchronization of the timing information. The first and second synchronization signals may be received during different transmission times, e.g., during different symbol periods or different subframes.

In one example where wireless communication system 100 supports mmW wireless communications, the synchronization process may include, for each transmission time, beamformed reference signals (BRSs) that may be swept in different beam directions to cover the entire coverage area of the base station 105. For example, base station 105 may transmit a first encoded message during a first transmission time, a second encoded message during a second transmission time, and so on. The BRS transmissions may continue in a sweeping pattern around the coverage area of each base station 105. The BRSs may each include a TB that includes an information component (e.g., system information) and an error detection code.

In certain aspects, a base station 105 may include a base station time indication manager 101 that may support the described techniques and identify a TB for transmission that includes the information component and the error detection code. Wireless communication system 100 may be preconfigured with a set bit shift per transmission time value, e.g., 2 bits shift/transmission time, 3 bits shift/transmission time, etc. The base station time indication manager 101 may transmit a first encoded message during a first transmission time and a second encoded message during a second transmission time. Each of the first encoded message and the second encoded message may include the TB (e.g., codeword). The TB may be cyclically (e.g., circularly) shifted a first bit length in the first encoded message and by a second bit length in the second encoded message. The first and second bit lengths may be determined based at least in part on the relative time distance between the corresponding first and second transmission times.

A receiving device, such as UE 115, may include a UE time indication manager 102 that may receive the first and second encoded messages during the corresponding first and second transmission times. The UE time indication manager 102 may identify the relative time distance between the first and second transmissions, e.g., based on the difference in time between receiving the encoded messages. The UE time indication manager 102 may use the relative time distance to identify the difference between the first bit length and the second bit length. The UE time indication manager 102 may use an iterative process that includes performing an error detection procedure to identify the first bit length, e.g., the error detection procedure may include performing error detection procedures for a plurality of other bit lengths. The UE time indication manager 102 may identify the first bit length based on the error detection procedure passing for the first bit length. From the identified first bit length (and the preconfigured system bit shift per transmission time information), the UE time indication manager 102 may determine the transmission time of the first encoded message and therefore obtain time synchronization with the transmitting base station 105.

Additionally or alternatively, the UE time indication manager 102 may identify the transmission time when only one decoded TB is available. For example, the UE time indication manager 102 may obtain the decoded TB that has been cyclically shifted the first bit length. The UE time indication manager 102 may perform the iterative error detection procedure by reverse cyclically shifting the TB for each bit of a plurality of bit lengths. The UE time indication manager 102 may identify the first bit length based on the error detection procedure passing for the first bit length. From the identified first bit length (and the preconfigured system bit shift per transmission time information), the UE time indication manager 102 may determine the transmission time of the first encoded message and therefore obtain time synchronization with the transmitting base station 105.

Figure 2:
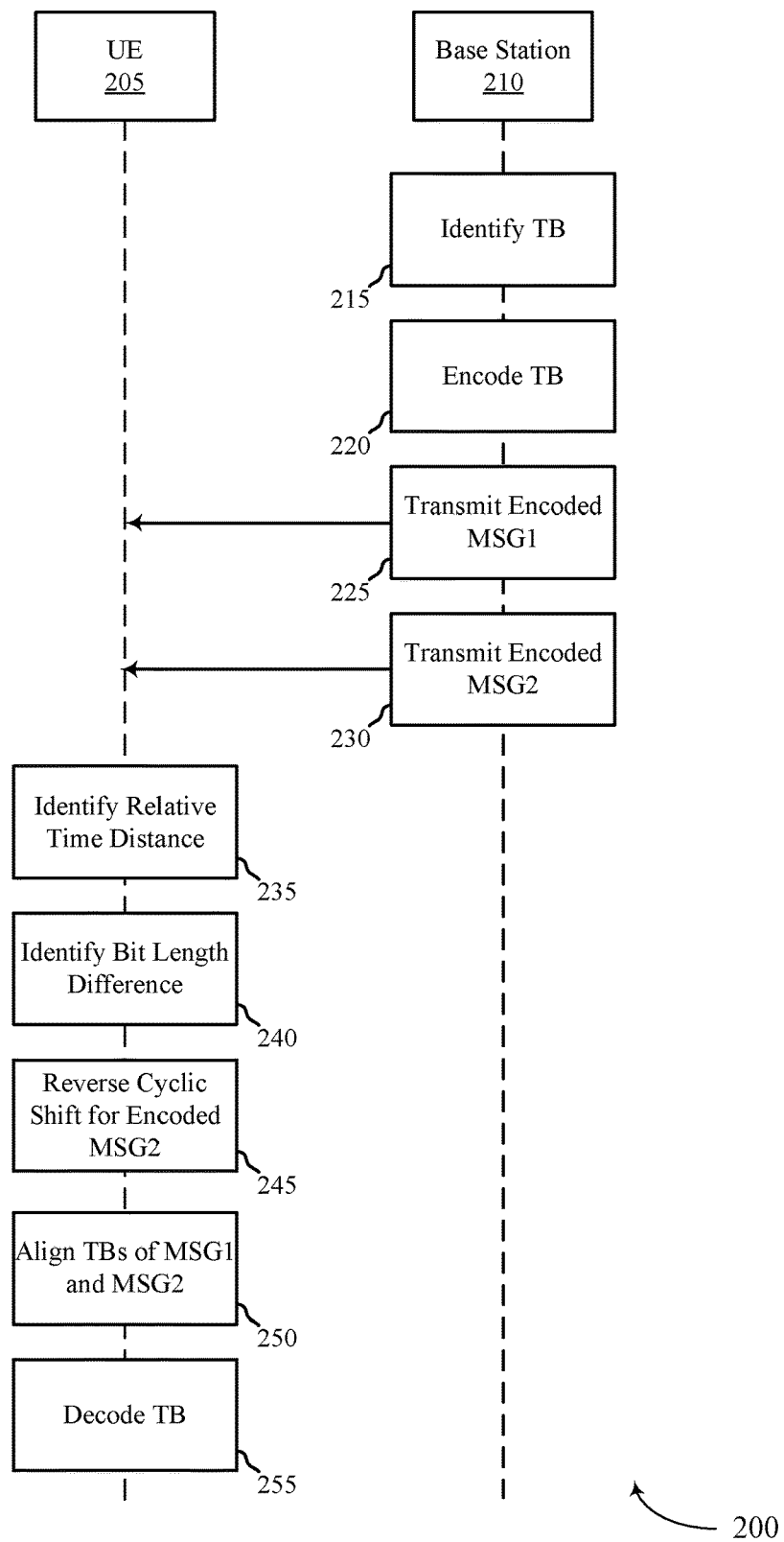
FIG. 2 illustrates an example of a process flow that supports communicating information plus an indication of transmission time, in accordance with one or more aspects of the present disclosure.

FIG. 2 illustrates an example of a process flow 200 for communicating information plus an indication of transmission time, in accordance with one or more aspects of the present disclosure. Process flow 200 may implement one or more aspects of wireless communication system 100 of FIG. 1. Process flow 200 may include a UE 205 and a base station 210, which may be examples of the corresponding devices described herein. Generally, process flow 200 provides one example for base station 210 to form multiple transmissions of system information and timing information and for UE 205 to combine the multiple transmissions received in different transmission times.

Process flow 200 may include UE 205 and base station 210 being preconfigured with a known cyclic bit shift per transmission time value. For example, the preconfigured information may indicate that for each transmission time, the TB (e.g., codeword) may be cyclically shifted one bit length, two bit lengths, three bit lengths, etc. The transmission times may correspond to a symbol index (such as a synchronization signal block index) and/or a subframe number. Thus, as an example where the preconfigured information indicates a cyclic bit length shift of two bits per symbol index (or subframe number), a TB encoded and transmitted during symbol index 2 (or subframe 2) may be cyclically (e.g., circularly) shifted four bit lengths. The same TB encoded and transmitted during symbol index 5 (or subframe 5) may be cyclically shifted 10 bit lengths. As another example where the preconfigured information indicates a cyclic bit length shift of three bits per symbol index (or subframe number), a TB encoded and transmitted during symbol index 2 (or subframe 2) may be cyclically (e.g., circularly) shifted six bit lengths. The same TB encoded and transmitted during symbol index 5 (or subframe 5) may be cyclically shifted 15 bit lengths. This preconfigured information may be known, e.g., a priori, to UE 205 and base station 210. For ease of reference only, the described techniques may refer to a preconfigured information indicating a cyclic bit shift of two bits per transmission time.

At 215, base station 210 may identify a TB for transmission. The TB may include an information component and an error detection code. In some examples, the information component may be system information. Generally, the same or substantially the same information may be conveyed in the TB in multiple transmissions. In some examples, one, two, three, etc., bits of the TB may be different between different transmissions. The location of these bits and confirmation that these bits may be different between multiple transmissions of the TB may be known a priori by UE 205 and base station 210.

At 220, base station 210 may encode the TB for transmission in one or more transmissions. For example, base station 210 may obtain a first encoded message by encoding the TB cyclically (e.g., circularly) shifted a first bit length and obtain a second encoded message by encoding the TB cyclically (e.g., circularly) shifted a second bit length. The first encoded message may be associated with a first transmission time and the second encoded message may be associated with a second transmission time. In some aspects, encoding the TB may include cyclically shifting the TB and then encoding the cyclically shifted TB using a cyclic code. In some aspects, encoding the TB may include encoding the TB using a cyclic code and then cyclically shifting the encoded TB.

In the example where preconfigured information indicates a cyclic bit shift of two bits per transmission time, encoding the TB for transmission may include cyclically shifting the TB a bit length that corresponds to two bit shifts per transmission time. In the example where the first transmission time corresponds to symbol index 2, the TB may be cyclically shifted four bits, e.g., the first bit length is four when the TB is transmitted during symbol index 2. In the example where the second transmission time corresponds to symbol index 5, the TB may be cyclically shifted ten bits, e.g., the second bit length is ten when the TB is transmitted during symbol index 5. Thus, base station 210 may select the first bit length based on the first transmission time and select the second bit length based on the second transmission time.

In some examples, encoding the TB for transmission may include performing an error detection procedure to confirm that the encoded TB cyclically shifted the first bit length (e.g., four in this example) only passes the error detection procedure for a bit length of four. For example, the base station 210 may perform the error detection procedure on the TB that has been cyclically shifted using each of one or more other bit lengths (e.g., other bit lengths associated with different transmission times). In one example where the error detection procedure passes for more than one bit length value, base station 210 may discard that error detection code (e.g., cyclic redundancy code (CRC)) and replace it with a different error detection code and repeat the error detection procedure until only the bit length of four passes.

Additionally or alternatively, base station 210 may use a modified error detection code (e.g., a modified CRC). For example, the error detection code of the TB may be a CRC or a modified CRC. For example, the base station 210 may permute the CRC (e.g., reverse the order of bits of the CRC), may interleave the CRC, may scramble the CRC using a known scrambling sequence, etc. The modified CRC may improve the instances where the error detection procedure only passes for the appropriate first bit length.

Additionally or alternatively, base station 210 may use one or more reserved bits of the TB to ensure that the error detection procedure only passes for the appropriate first bit length. For example, one, two, three, etc., bits of the TB may be reserved and may be adjusted when more than one bit length passes the error detection procedure. The base station 210 may adjust the reserved bit(s) and repeat the error detection procedure until only the bit length of four (continuing with the example above) passes.

At 225, base station 210 may transmit the first encoded message during the first transmission time. The first encoded message may be obtained by encoding the TB that has been cyclically shifted the first bit length. Continuing with the example above, the first transmission time may be symbol index 2 and the first bit length may be four bits. At 230, base station 210 may transmit the second encoded message during the second transmission time. The second encoded message may be obtained by encoding the TB that has been cyclically shifted the second bit length. Continuing with the example above, the second transmission time may be symbol index 5 and the second bit length may be ten bits. Thus, the relative time distance between the first transmission time of the first encoded message and the second transmission time of the second encoded message may convey an indication of the difference between the first bit length and the second bit length.

Thus, base station 210 may form the transmission(s) containing the system and the timing information by assembling the TB that includes the information component and the error detection code. Base station 210 may cyclically shift the TB based on the transmission timing (e.g., OFDM symbol index or subframe number of the transmission time). Base station 210 may encode the TB using a cyclic code, such as a tail biting convolution code (TBCC), and transmit the encoded messages during the corresponding transmission times. The relative cyclic shift used for any two timing information may be a function of the time distance (or difference) of the two timing information. That is, the relative cyclic shift between two transmission times (e.g., symbol indexes) may be determined by the difference between the two transmission times. It is to be noted that cyclic shift is one possible permutation. In some aspects, base station 210 may use permutations other than cyclic shifts, such that the relative permutation between two encoded messages remains a function of the time distance between their respective transmission times. This provides for the receiver, such as UE 205, to align multiple received encoded messages based on the relative time distance between their respective transmission times.

At 235, UE 205, having received the first and second encoded messages during the corresponding first and second transmission times, may identify the relative time distance between the first transmission time and the second transmission time. Continuing the example from above, the relative time distance between the first transmission time (symbol index 2) and the second transmission time (symbol index 5) is three symbols. It can be noted that the relative distance between the first transmission time and the second transmission time is irrespective of the actual transmission times. For example, the first transmission time may correspond to symbol index 8 and the second transmission time may correspond to the symbol index 11. In this example, the relative time distance between the first transmission time and the second transmission time is still three symbols. Thus, while UE 205 may identify the relative time distance between the first and second transmissions, UE 205 may still not know, at this point, what the absolute transmission times correspond to, e.g., symbol indexes 2 and 5, 8 and 11, etc.

At 240, UE 205 may identify the difference between the first bit length and the second bit length based on the identified relative time distance. For example, in the example of two bit shifts per transmission time and the relative time distance of three symbols, the UE 205 may determine that the difference between the first bit length and the second bit length is six bits (two bits shift/transmission time multiplied by three symbols).

At 245, UE 205 may reverse cyclically shift the second encoded message. In the example above, this may include reverse cyclically shifting the encoded TB of the second encoded message by six bits. Generally, this may remove the cyclic bit shift of the encoded TB of the second encoded message with respect to the cyclic bit shift of the encoded TB of the first encoded message. Thus, at 250 UE 205 may align the TBs of the first and second encoded messages. In some aspects, aligning the TB of the first and second messages may be performed on a bit level (e.g., bit aligned) and/or on a group of bits level.

In some examples, aligning the TB of the first and second messages may include aligning decision metrics associated with the encoded TBs. Generally, the decision metrics may include an indicator of whether the respective bit or bits are a "1" or a "0." Examples of decision metrics may include log likelihood ratios (LLRs). LLRs are commonly used as soft decision metrics for decoding bits, however, other types of decision metrics may also be used for decoding the TBs.

For example, decision metrics used to decode TBs are combined for successive encoded TBs to improve decoding of the later received encoded TBs. UE 205 may compute LLRs for code bits for the encoded TB received in the first encoded message and the encoded TB received in the second encoded message. The decision metrics may provide, at least to a certain degree of confidence, the encoded TB that was transported in the first and second encoded messages.

The UE 205 may perform an error detection procedure (e.g., CRC check) to determine or identify the first bit length (e.g., the bit length that was used to cyclically shift the TB in the first encoded message). The error detection procedure may include the UE performing the CRC check using different bit shift lengths that correspond to different transmission times. For example and continuing with the example above where the bit shift per transmission time is two bits, UE 205 may perform the CRC check reversing a two bit length bit shift. As the first encoded message was transmitted during symbol index 2, the error detection procedure will fail for the first bit length bit shift. UE 205 may perform the CRC check again reversing a four bit length bit shift, which in this example will pass. Thus, UE 205 may have identified first bit length as four bits. Optionally, UE 205 may continue performing the error detection procedure reversing six, eight, ten, etc., bit length bit shifts to confirm that the CRC check only passes for the identified first bit length. When no other bit length bit shifts pass the CRC check, UE 205 may have confirmed that the first bit length corresponding to the first encoded message received during the first transmission time is four bits.

When, however, multiple passes of the CRC check are identified (e.g., the CRC check passes for multiple bit length bit shift values), UE 205 may discard the TBs, in one example. In another example, UE 205 may access and use other preconfigured information to identify the first bit length candidate bit lengths. For example, UE 205 may perform a feasibility check for the different candidate bit lengths to determine which bit length is likely the corresponding first bit length. As can be appreciated, the information component of the TB may be consistent between different transmissions and may have a preconfigured structure. UE 205 may compare various values of the TBs to determine which candidate bit length is the correct first bit length. Examples of a feasibility check may include, but are not limited to, comparing the system bandwidth between the TBs of the first and second encoded messages, determining whether a field of the system information is within a restrictive range, identifying a bit pattern of the system information that is inconsistent with expected bit patterns, comparing to previously decoded TBs, an antenna port value, etc.

Once UE 205 has determined the first bit length, the first transmission time can also be determined. For example, once UE 205 has identified the first bit length as four bits and knows a priori that the preconfigured information indicates two bits shift per transmission time, UE 205 may determine that the transmission time was a second available transmission time (e.g., symbol index 2). Thus, UE 205 may now have an indication of the timing information and therefore be time synchronized, at least to certain aspects, with base station 210. Thus, the UE 205 may determine the relative shifts (e.g., circular shift) between the encoded message (e.g., different RVs) received in different synchronization signal blocks, without knowing the block index (and thus the RV number); can align, combine, and decode the RVs; and use the CRC in the decoded message to determine the circular shift (and hence the block index).

At 255, UE 205 may decode the TB and use the system information to complete the synchronization process with base station 210.

Figure 3:
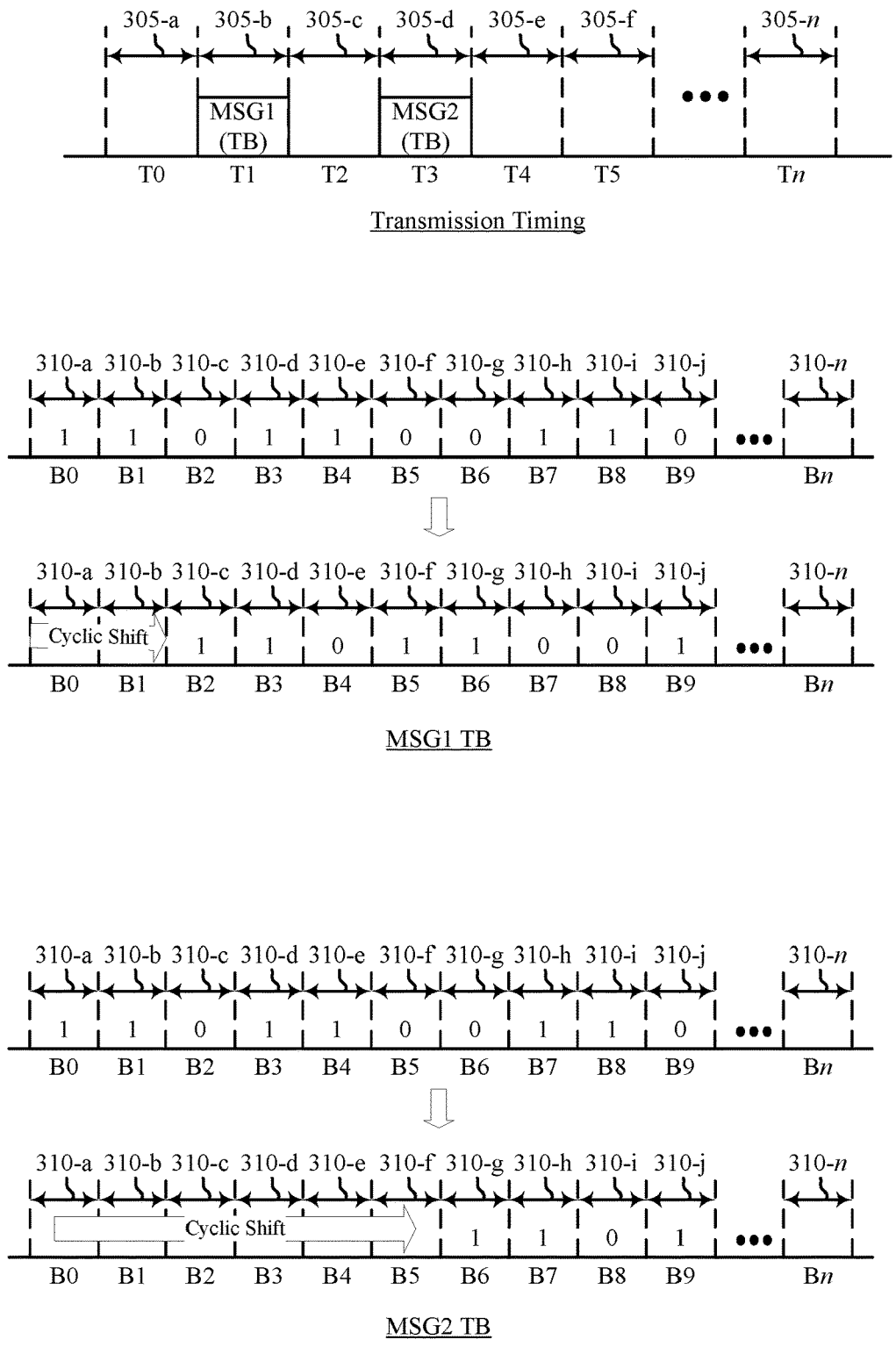
FIG. 3 illustrates an example of a transmission diagram that supports communicating information plus an indication of transmission time, in accordance with one or more aspects of the present disclosure.

FIG. 3 illustrates an example of a transmission diagram 300 for communicating information plus an indication of transmission time, in accordance with one or more aspects of the present disclosure. Transmission diagram 300 may implement one or more aspects of wireless communication system 100 and/or process flow 200 of FIGS. 1 and 2. Generally, transmission diagram 300 may include a transmission timing diagram that includes multiple transmission times 305 as well as example TBs for the first encoded message and the second encoded message. Each example TB may include a plurality of bits 310 of the TB.

As discussed above, a wireless communication system may be preconfigured with a known bit shift length per transmission time value. In the example transmission diagram 300, the preconfigured value is two bits cyclic shift per transmission time. A base station may cyclically shift a TB of a first encoded message a first bit length and cyclically shift the TB of a second encoded message a second bit length. The relative time distance between the first transmission time and the second transmission time may convey an indication of the difference between the first bit length and the second bit length.

The base station may have a plurality of transmission times 305 available (identified as transmission times 305-*a* to 305-*n*) to transmit an encoded message that includes the TB. The number of available transmission times 305 may be dependent upon system configuration, dynamically selected by the base station, etc. In some aspects, associated with each available transmission time 305 is a corresponding bit length of cyclic shift. The base station may refrain from transmitting in all available transmission times and dynamically determine which available transmission time 305 to transmit in.

The base station may identify a TB for transmission that includes the information component (e.g., system information) and an error detection code (e.g., CRC). The TB may consist of a plurality of bits 310 (identified as bits 310-*a* to 310-*n*).

The TB may be cyclically shifted a first bit length that is dependent upon the transmission time for the TB. In the example transmission diagram 300, the base station may determine that the first encoded message will be transmitted during the transmission time 305-*b* (e.g., transmission time T1) and the second encoded message will be transmitted during the transmission time 305-*d* (e.g., transmission time T3).

The base station may encode the TB for transmission in the first and second messages. Encoding the TB for transmission during the transmission time 305-*b* may include cyclically shifting the TB two bits (e.g., due to the preconfigured two bits shift length per transmission time or T1×2=2 bits). Thus, the TB for the first encoded message may be shifted two bits such that the first bit begins at bit 310-*c* (e.g., B2) rather than at bit 310-*a* (e.g., B0).

Similarly, encoding the TB for transmission during the transmission time 305-*d* may include cyclically shifting the TB six bits (e.g., due to the preconfigured two bits shift length per transmission time or T3×2=6 bits). Thus, the TB for the second encoded message may be shifted six bits such that the first bit begins at bit 310-*g* (e.g., B5) rather than at bit 310-*a* (e.g., B0). The base station may transmit the first encoded message during the transmission time 305-*b* that is obtained by encoding the TB cyclically shifted a first bit length (e.g., two bits) and transmit the second encoded message during the transmission time 305-*d* that is obtained by encoding the TB cyclically shifted a second bit length (e.g., six bits).

A UE receiving the first and second encoded messages during the transmission times 305-*b* and 305-*d,* respectively, may determine that the relative time distance between the two transmission times is two transmission times. Given the preconfigured bit length shift per transmission time, the UE may determine that the TB for encoded message two can be aligned with the TB of encoded message one by reverse cyclically shifting the TB from encoded message two by four bits (e.g., the identified two transmission times×two bits shift length per transmission time=4 bits). Thus, the UE may align the TBs from the encoded first and second messages for decoding (e.g., bit align, align based on decision metrics, etc.). Using an iterative error detection procedure, the UE may also determine what the first bit length for the TB of the first encoded message is and therefore determine that transmission time 305-*b* was used to transmit the first encoded message. Thus, UE may determine the system information and the timing information associated with the base station.

Figure 4:
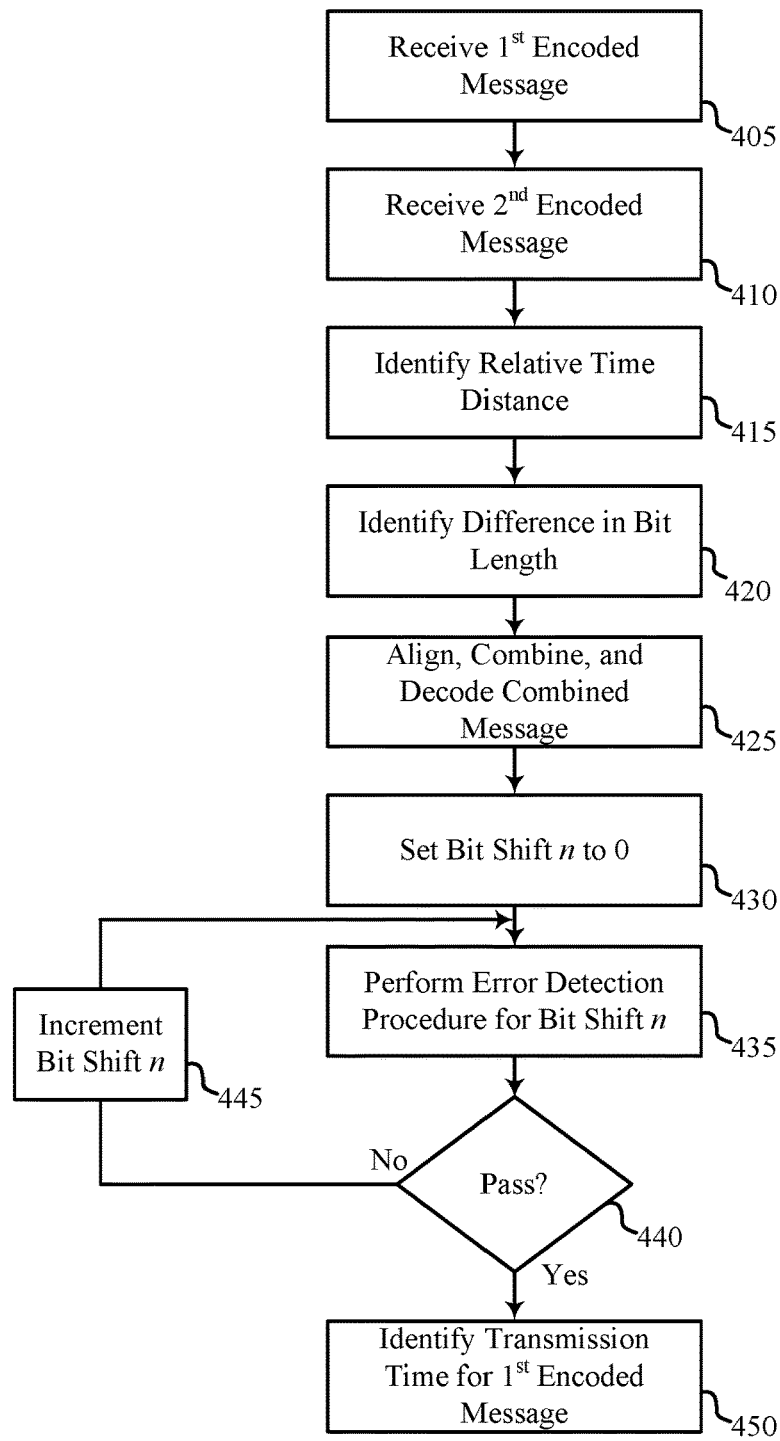
FIG. 4 illustrates an example of a method that supports communicating information plus an indication of transmission time, in accordance with one or more aspects of the present disclosure.

FIG. 4 illustrates an example of a method flow 400 for communicating information plus an indication of transmission time, in accordance with one or more aspects of the present disclosure. Method flow 400 may implement one or more aspects of wireless communication system 100, process flow 200, and/or transmission diagram 300 of FIGS. 1 through 3. The operations of method flow 400 may be implemented by a UE 115 or its components as described herein. For example, the operations of method flow 400 may be performed by a UE time indication manager as described with reference to FIGS. 11 through 14. In some examples, a UE 115 may execute a set of codes to control the functional elements of the device to perform the functions described below. Additionally or alternatively, the UE 115 may perform aspects the functions described below using special-purpose hardware.

Generally, method flow 400 illustrates one example of a method for a UE to combine multiple transmissions that carry the same information component (e.g., system information) but have different transmission time components (e.g., received during different symbol indexes). Broadly, the UE receives the transmissions in two or more transmission instances corresponding to different transmission times. The UE determines the relative cyclic shifts of the two or more transmissions from the difference of the transmission timing between the transmissions. The UE aligns the bits from the two or more received signals by undoing (e.g., reverse cyclically shifting) the relative cyclic shift of the second transmission (e.g., the TB associated with the second transmission). The UE then combines the aligned received messages, e.g., by combining LLRs, and decodes the combined message.

At 405, the UE may receive a first encoded message during a first transmission time. The first encoded message may include a TB cyclically shifted a first bit length. The first bit length may be associated with the first transmission time. At 410, the UE may receive a second encoded message during a second transmission time. The second encoded message may include a TB cyclically shifted a second bit length. The second bit length may be associated with the second transmission time.

At 415, the UE may identify a relative time distance (or difference) between the first transmission time and the second transmission time. For example, the UE may determine that the relative time distance between the first transmission and the second transmission is two transmission times, three transmission times, etc.

At 420, the UE may identify a difference between the first bit length and the second bit length. The difference may be based on the relative time distance between the first transmission and the second transmission. For example, the UE may be preconfigured for operating in a network that uses two, three, four, or some other number of bits shift per transmission time. This information may be known a priori to the UE. The UE may use the preconfigured information and the identified relative time distance to determine the difference between the first bit length and the second bit length. As one example where the preconfigured bit shift length is two bits per transmission time, the UE may use the identified relative time distance of two transmission times multiplied by the two bits per transmission time to determine that the difference between the first bit length and the second bit length is four bits.

At 425, the UE may align, combine, and decode the combined messages by reverse cyclically shifting the encoded TB of the second encoded message by four bits, continuing with the example above. Aligning the encoded TBs may include bit aligning the TBs or aligning the TBs using a group of bits. Aligning the TBs may include aligning decision metrics associated with bit(s), e.g., LLRs. Aligning the TBs may provide for a confidence level that the UE has received and decoded the TB above a threshold level, e.g., greater than 80%, 90%, 95%, 99.999%, etc. Decoding the TBs may provide the decoded TB.

At 430, the UE may set a bit shift n value to zero. The bit shift n value may correspond to an available bit shift associated with the network that UE is connected to. For example, if the preconfigured bit shift length per transmission time is two bits, available bit shift n values may include zero bits (corresponding to transmission time T0), two bits (corresponding to transmission time T1), four bits (corresponding to transmission time T2), etc. As another example where the preconfigured bit shift length per transmission time is three bits, available bit shift n values may include zero bits (corresponding to transmission time T0), three bits (corresponding to transmission time T1), six bits (corresponding to transmission time T2), and so on.

At 435, the UE may perform an error detection procedure on the TB using the current bit shift n value. The error detection procedure may be a CRC check procedure, in some examples. Thus, the UE may reverse cyclically shift the TB the bit shift n value and perform a CRC check. At 440, the UE may determine whether the error detection procedure passed for the bit shift n value. If the error detection procedure failed, at 445 the UE may increment the bit shift n value to the next available bit shift and return to 435 to perform the error detection procedure on the current bit shift n value (e.g., the incremented n value). The UE may continue this procedure until the error detection procedure passes for a bit shift n value. This bit shift n value may correspond to the first bit length that was used to cyclically shift the TB for the first encoded message. Continuing with the example above, the identified first bit length may be two bits.

At 450, the UE may identify the transmission time for the first encoded message based on the identified first bit length. As the UE knows a priori that the preconfigured bit shift length per transmission time is two bits and the identified first bit length is two bits, the UE may determine that the first encoded message was received during transmission time T1. This may provide some degree of synchronization between the UE and the base station that transmitted the first encoded message.

Figure 5:
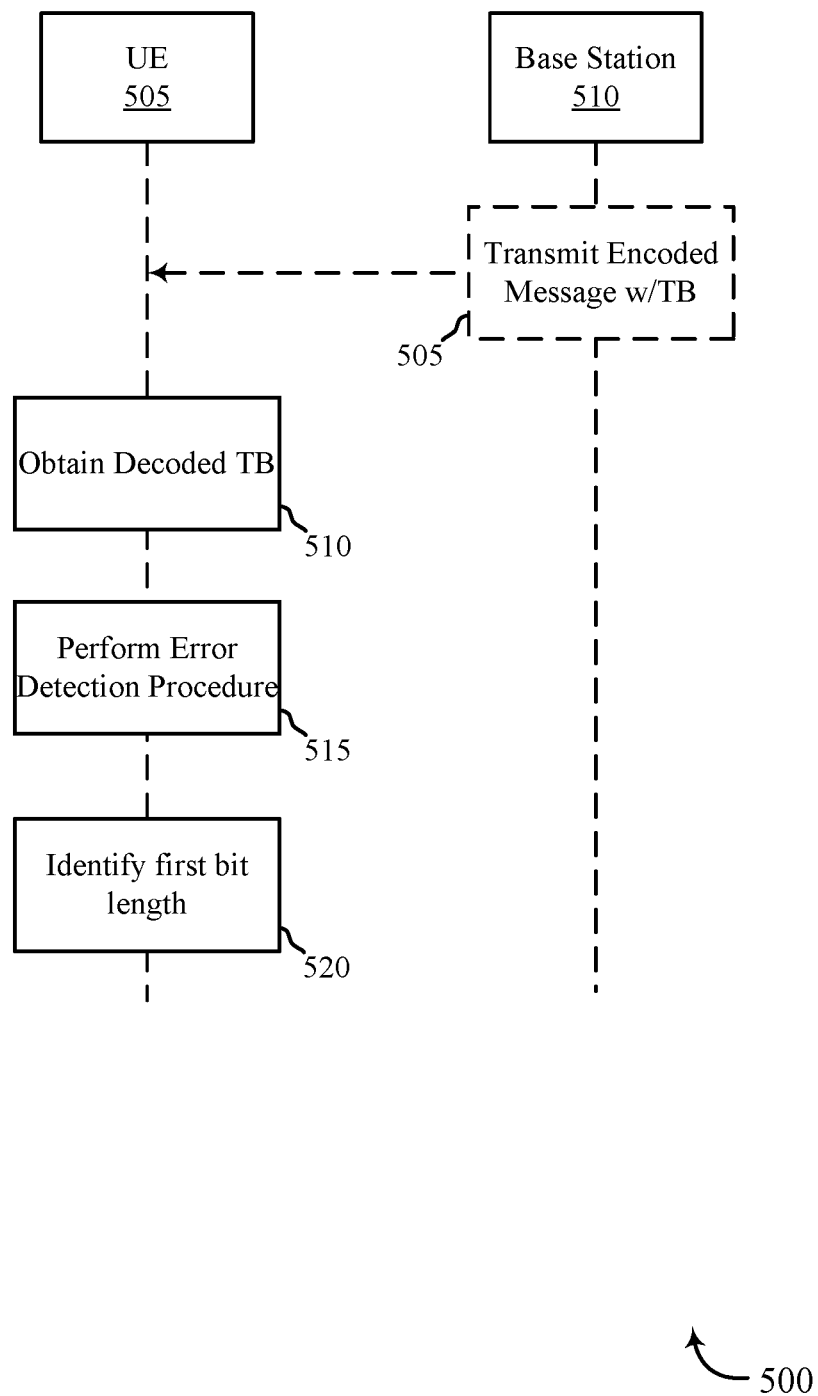
FIG. 5 illustrates an example of a process flow that supports communicating information plus an indication of transmission time, in accordance with one or more aspects of the present disclosure.

FIG. 5 illustrates an example of a process flow 500 for communicating information plus an indication of transmission time, in accordance with one or more aspects of the present disclosure. Process flow 500 may implement aspects of wireless communication system 100, process flow 200, transmission diagram 300, and/or method flow 400 of FIGS. 1 through 4. Process flow 500 may include a UE 505 and a base station 510, which may be examples of the corresponding devices described herein.

At 505, base station 510 may optionally transmit an encoded message that is obtained by encoding a TB cyclically shifted a first bit length. The UE 505 may decode the TB using the described techniques. The TB may be cyclically shifted a first bit length.

At 510, the UE 505 may obtain the decoded TB that has been cyclically shifted the first bit length. The TB may include an information component and an error detection code. The UE 505 may obtain the decoded TB from combining TBs received in multiple transmissions and/or based on receiving a single transmission of the TB.

At 515, the UE 505 may perform an error detection procedure (e.g., CRC check) on the TB by reverse cyclically shifting the TB for each of one or more other bit lengths. The other bit lengths may correspond to available bit shifts associated with the network that UE 505 is connected to. For example, if the preconfigured bit shift length per transmission time may be three bits, available bit shift values may include zero bits (corresponding to transmission time T0), three bits (corresponding to transmission time T1), six bits (corresponding to transmission time T2), and so on. Thus, UE 505 may start with a bit shift of zero bits for the error detection procedure. If the error detection procedure fails for the bit shift of zero bits, the UE 505 may apply the next available bit shift (e.g., three bits shift) and repeat the error detection procedure. The UE 505 may continue this in an iterative fashion.

At 520, the UE 505 may identify the first bit length based on the error detection procedure passing for the first bit length. For example, the error detection procedure may fail for each bit shift value other than the actual bit length used to cyclically shift the decoded TB. The UE 505 may use the identified first bit length and the preconfigured bit shift per transmission time value to determine the transmission time associated with the decoded TB.

Thus, process flow 500 supports a UE 505 decoding the system information and the timing information irrespective of whether the UE 505 decoded the TB after combining (e.g., multiple transmissions) or from a single transmission. The UE 505 decodes the TB using one or more received signals. The UE 505 determines the cyclic shift of the decoded TB using the error detection procedure and the error detection code contained in the TB. The UE 505 determines the transmission timing from the cyclic shift and reverse cyclically shifts the TB to obtain the original TB and thus the system information.

Figure 6:
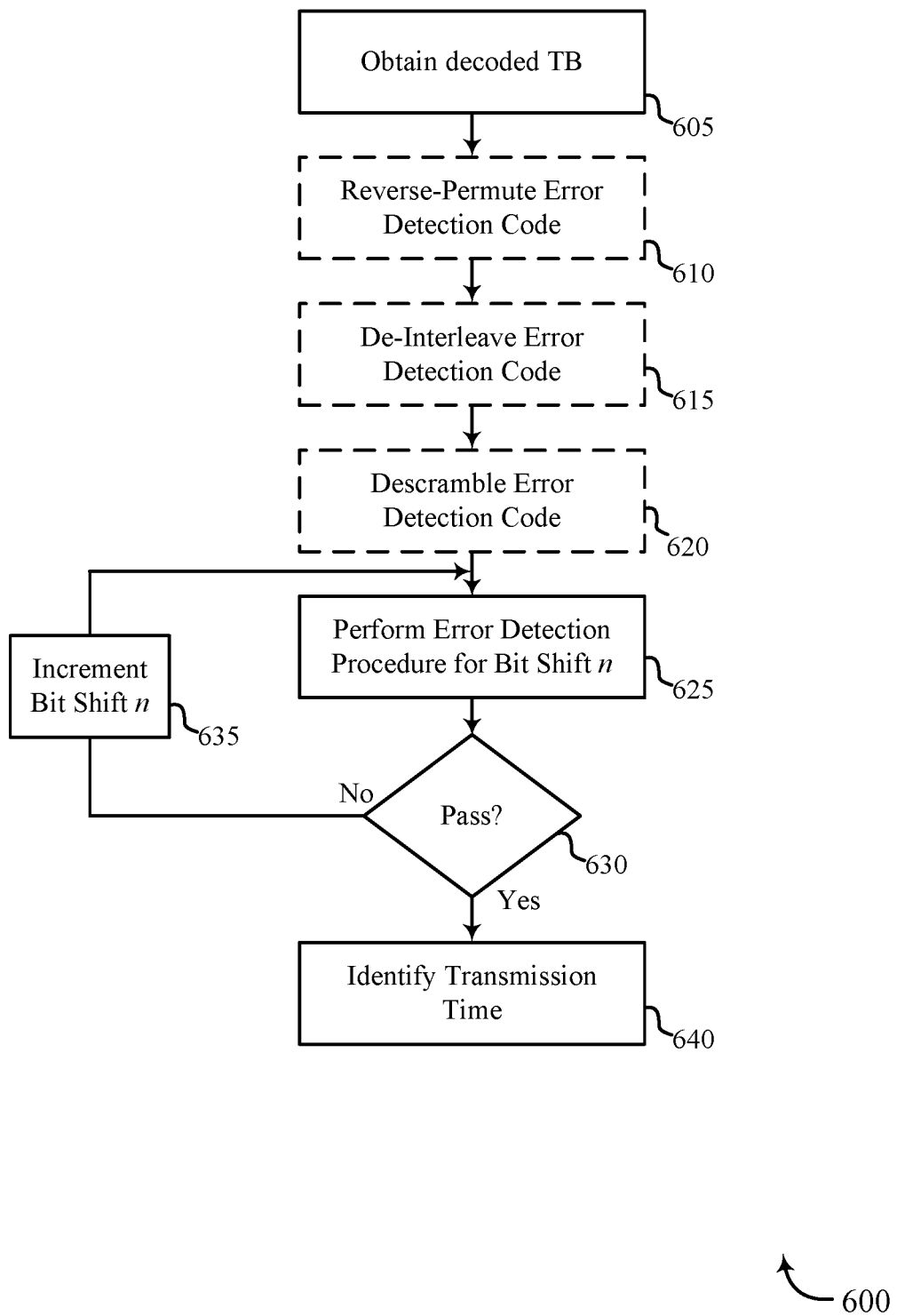
FIG. 6 illustrates an example of a method that supports communicating information plus an indication of transmission time, in accordance with one or more aspects of the present disclosure.

FIG. 6 illustrates an example of a method flow 600 for communicating information plus an indication of transmission time, in accordance with one or more aspects of the present disclosure. Method flow 600 may implement one or more aspects of wireless communication system 100, process flow 200, method flow 400, transmission diagram 300 of FIGS. 1 through 4. The operations of method flow 600 may be implemented by a UE 115 or its components as described herein. For example, the operations of method flow 600 may be performed by a UE time indication manager as described with reference to FIGS. 11 through 14. In some examples, a UE 115 may execute a set of codes to control the functional elements of the device to perform the functions described below. Additionally or alternatively, the UE 115 may perform aspects the functions described below using special-purpose hardware.

Generally, the UE may obtain a decoded TB using any of the techniques discussed herein, e.g., from receiving multiple transmissions including the TB and/or from receiving a single transmission of the TB. In some aspects, the TB may include an error detection code that has been modified in one form or fashion. For example, the error detection code of the TB may be permuted (e.g., the bits may be rearranged in a known manner such as reversed order), may be interleaved, may be scrambled using a known scrambling code, etc. The modified error detection code may be used for error detection of the TB and to increase resilience at detecting the cyclic shift errors. Thus, a base station may implement the modified error detection code (e.g., CRC) to confirm that the error detection procedure only passes for the appropriate first bit length. In this case, the UE may remove the modification of the error detection code before performing the error detection procedure.

At 605, the UE may obtain the decoded TB that has been cyclically shifted the first bit length. The TB may include an information component and an error detection code. The UE may obtain the decoded TB from combining TBs received in multiple transmissions and/or based on receiving a single transmission of the TB.

At 610, the UE may optionally reverse-permute the error detection code contained in the TB. In the example where the base station has permuted the error detection code using a known permutation scheme, the UE may reverse-permute the error detection code using the same scheme.

At 615, the UE may optionally de-interleave the error detection code contained in the TB. In the example where the base station has interleaved the error detection code using one or more known bits or bit patterns, the UE may de-interleave the error detection code using the same bits or bit patterns.

At 620, the UE may optionally descramble the error detection code contained in the TB. In the example where the base station has scrambled the error detection code using a known scrambling code, the UE may descramble the error detection code using the same scrambling code.

At 625, the UE may perform an error detection procedure on the TB using the bit shift n value. The error detection procedure may be a CRC check procedure, in some examples. Thus, the UE may reverse cyclically shift the TB the bit shift n value and perform a CRC check. At 630, the UE may determine whether the error detection procedure passed for the bit shift n value. If the error detection procedure failed, at 635 the UE may increment the bit shift n value to the next available bit shift and return to 625 to perform the error detection procedure on the current bit shift n value (e.g., the incremented n value). The UE may continue this procedure until the error detection procedure passes for a bit shift n value. This bit shift n value may correspond to the first bit length that was used to cyclically shift the decoded TB. Continuing with the example above, the identified first bit length may be two bits.

At 640, the UE may identify the transmission time for the encoded message that carried the TB based on the identified first bit length. As the UE knows a priori that the preconfigured bit shift length per transmission time is two bits and the identified first bit length of two bits, the UE may determine that the encoded message was received during transmission time T1. This may provide some degree of synchronization between the UE and the base station that transmitted the first encoded message.

Figure 7:
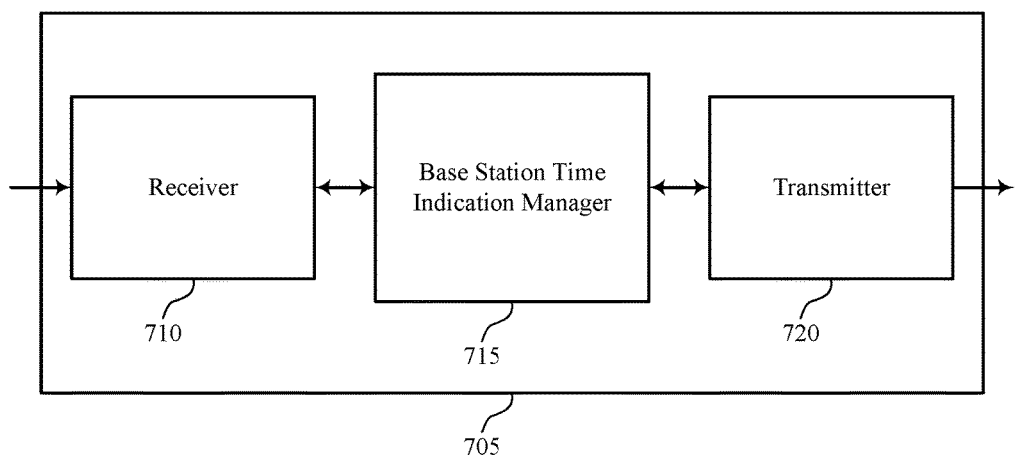
FIGS. 7 through 9 show block diagrams of a device that supports communicating information plus an indication of transmission time, in accordance with one or more aspects of the present disclosure.

FIG. 7 shows a block diagram 700 of a wireless device 705 that supports communicating information plus an indication of transmission time, in accordance with one or more aspects of the present disclosure. Wireless device 705 may be an example of aspects of a base station, such as a base station 105, as described with reference to FIGS. 1 through 6. Wireless device 705 may include a receiver 710, a base station time indication manager 715, and a transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to communicating information plus an indication of transmission time, etc.). Information may be passed on to other components of the device. The receiver 710 may be an example of aspects of the transceiver 1035 described with reference to FIG. 10.

Base station time indication manager 715 may be an example of aspects of the base station time indication manager 1015 described with reference to FIG. 10.

Base station time indication manager 715 may identify a TB for transmission including an information component and an error detection code. Base station time indication manager 715 may transmit a first encoded message during a first transmission time, the first encoded message obtained by encoding the TB cyclically shifted a first bit length. Base station time indication manager 715 may transmit a second encoded message during a second transmission time, the second encoded message obtained by encoding the TB cyclically shifted a second bit length, where a relative time distance between the first transmission time and the second transmission time conveys an indication of the difference between the first bit length and the second bit length.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may include a single antenna, or it may include a set of antennas.

Figure 8:
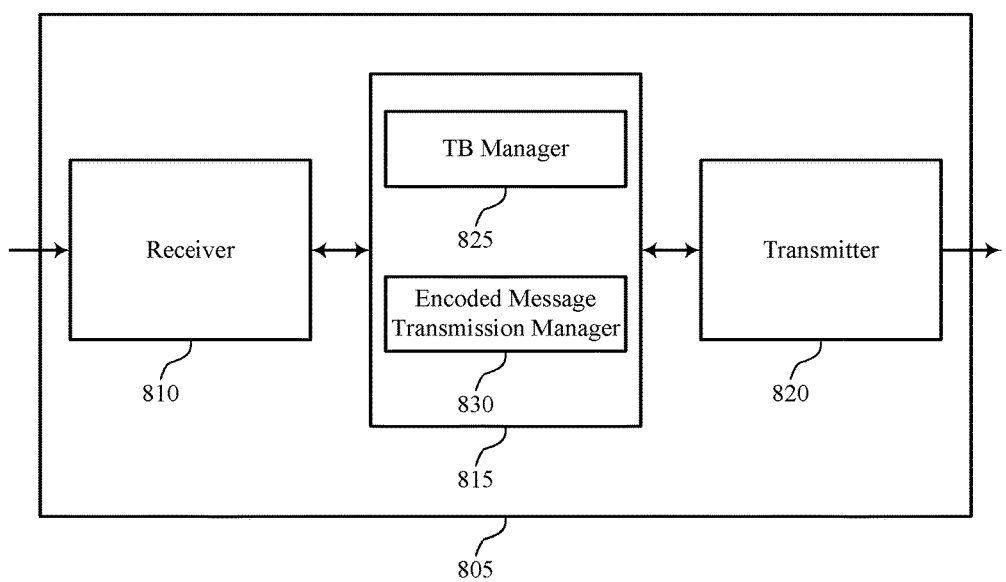

FIG. 8 shows a block diagram 800 of a wireless device 805 that supports communicating information plus an indication of transmission time, in accordance with one or more aspects of the present disclosure. Wireless device 805 may be an example of aspects of a wireless device 705 or a base station, such as a base station 105, as described with reference to FIGS. 1 through 7. Wireless device 805 may include a receiver 810, a base station time indication manager 815, and a transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to communicating information plus an indication of transmission time, etc.). Information may be passed on to other components of the device. The receiver 810 may be an example of aspects of the transceiver 1035 described with reference to FIG. 10.

Base station time indication manager 815 may be an example of aspects of the base station time indication manager 1015 described with reference to FIG. 10.

Base station time indication manager 815 may also include a TB manager 825 and an encoded message transmission manager 830.

TB manager 825 may identify a TB for transmission including an information component and an error detection code. In some cases, the information component includes a system information component.

Encoded message transmission manager 830 may transmit a first encoded message during a first transmission time, the first encoded message obtained by encoding the TB cyclically shifted a first bit length. Encoded message transmission manager 830 may transmit a second encoded message during a second transmission time, the second encoded message obtained by encoding the TB cyclically shifted a second bit length, where a relative time distance between the first transmission time and the second transmission time conveys an indication of the difference between the first bit length and the second bit length. Encoded message transmission manager 830 may cyclically shift the TB, encode the cyclically shifted TB using a cyclic code. Encoded message transmission manager 830 may encode the TB using a cyclic code, and cyclically shift the encoded TB. In some cases, the transmission time includes at least one of a symbol index or a subframe number.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may include a single antenna, or it may include a set of antennas.

Figure 9:
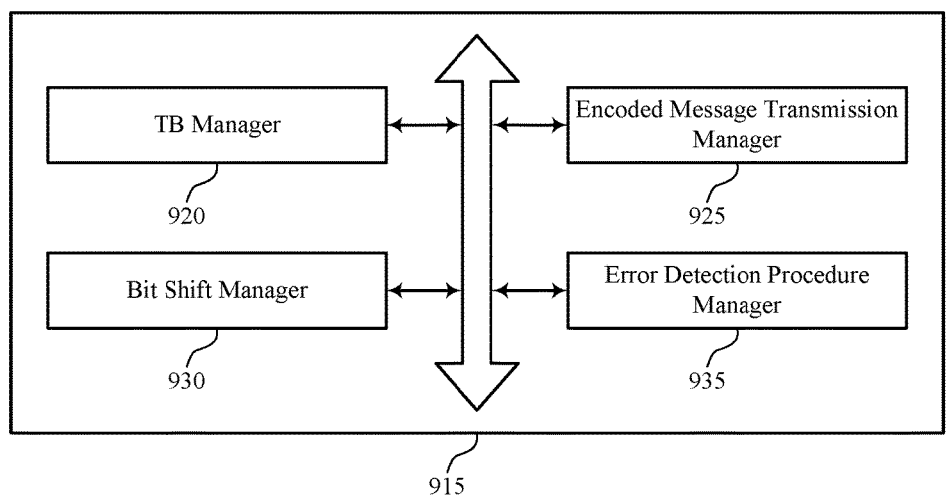

FIG. 9 shows a block diagram 900 of a base station time indication manager 915 that supports communicating information plus an indication of transmission time, in accordance with one or more aspects of the present disclosure. The base station time indication manager 915 may be an example of aspects of a base station time indication manager 715, a base station time indication manager 815, or a base station time indication manager 1015 described with reference to FIGS. 7, 8, and 10. The base station time indication manager 915 may include a TB manager 920, an encoded message transmission manager 925, a bit shift manager 930, and an error detection procedure manager 935. Each of these modules may communicate, directly or indirectly, with one another (e.g., via one or more buses).

TB manager 920 may identify a TB for transmission including an information component and an error detection code. In some cases, the information component includes a system information component.

Encoded message transmission manager 925 may transmit a first encoded message during a first transmission time, the first encoded message obtained by encoding the TB cyclically shifted a first bit length. Encoded message transmission manager 925 may transmit a second encoded message during a second transmission time, the second encoded message obtained by encoding the TB cyclically shifted a second bit length, where a relative time distance between the first transmission time and the second transmission time conveys an indication of the difference between the first bit length and the second bit length. Encoded message transmission manager 925 may cyclically shift the TB and encode the cyclically shifted TB using a cyclic code. Encoded message transmission manager 925 may encode the TB using a cyclic code and cyclically shift the encoded TB. In some cases, the transmission time includes at least one of a symbol index or a subframe number.

Bit shift manager 930 may select the first bit length is based on the first transmission time and select the second bit length is based on the second transmission time.

Error detection procedure manager 935 may perform an error detection procedure on the TB that has been cyclically shifted one or more other bit lengths. Error detection procedure manager 935 may adjust one or more reserved bits of the TB until the error detection procedure fails for each of the one or more other bit lengths. In some cases, the one or more other bit lengths are associated with other available transmission times. In some cases, the error detection code includes a CRC check.

Figure 10:
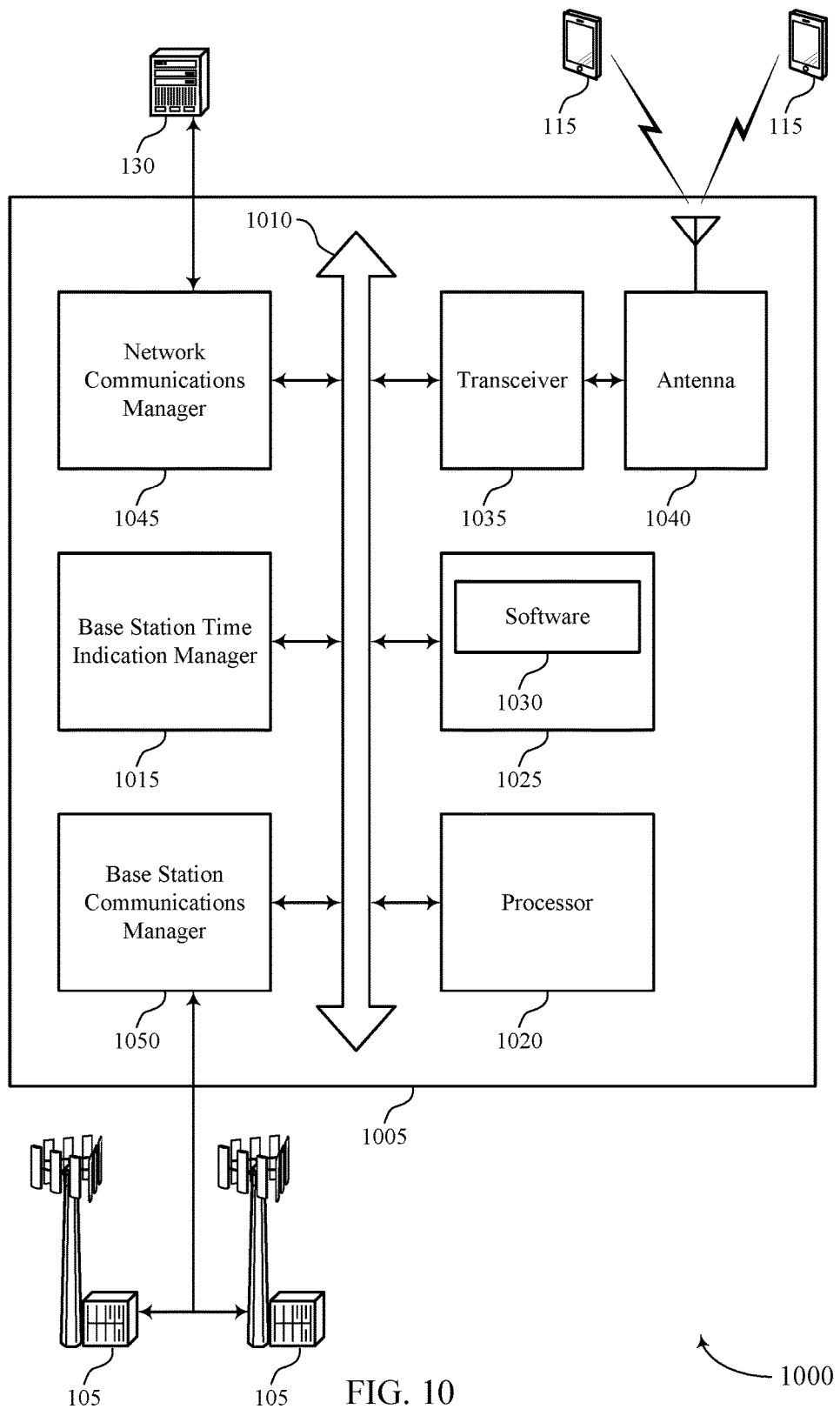
FIG. 10 illustrates a block diagram of a system including a base station that supports communicating information plus an indication of transmission time, in accordance with one or more aspects of the present disclosure.

FIG. 10 shows a diagram of a system 1000 including a device 1005 that supports communicating information plus an indication of transmission time, in accordance with one or more aspects of the present disclosure. Device 1005 may be an example of or include the components of wireless device 705, wireless device 805, or a base station, such as a base station 105, as described above, e.g., with reference to FIGS. 1 through 8. Device 1005 may include components for bi-directional voice and data communications including components for transmitting and receiving communications, including a base station time indication manager 1015, a processor 1020, a memory 1025, a software 1030, a transceiver 1035, an antenna 1040, a network communications manager 1045, and a base station communications manager 1050. These components may be in electronic communication via one or more busses (e.g., bus 1010). Device 1005 may communicate wirelessly with one or more UEs 115.

Processor 1020 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting communicating information plus an indication of transmission time).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware and/or software operation such as the interaction with peripheral components or devices.

Software 1030 may include code to implement aspects of the present disclosure, including code to support communicating information plus an indication of transmission time. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115.

Base station communications manager 1050 may manage communications with other base station 105, and may include a controller or scheduler for controlling communications with UEs 115 in cooperation with other base stations 105. For example, the base station communications manager 1050 may coordinate scheduling for transmissions to UEs 115 for various interference mitigation techniques such as beamforming or joint transmission. In some examples, base station communications manager 1050 may provide an X2 interface within an LTE/LTE-A wireless communication network technology to provide communication between base stations 105.

Figure 11:
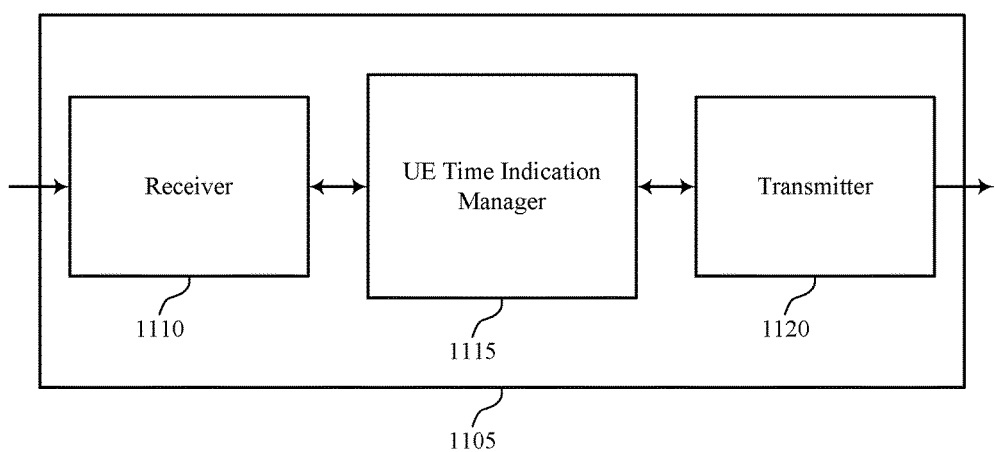
FIGS. 11 through 13 show block diagrams of a device that supports communicating information plus an indication of transmission time, in accordance with one or more aspects of the present disclosure.

FIG. 11 shows a block diagram 1100 of a wireless device 1105 that supports communicating information plus an indication of transmission time, in accordance with one or more aspects of the present disclosure. Wireless device 1105 may be an example of aspects of a UE 115 as described with reference to FIGS. 1 through 6. Wireless device 1105 may include a receiver 1110, a UE time indication manager 1115, and a transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to communicating information plus an indication of transmission time, etc.). Information may be passed on to other components of the device. The receiver 1110 may be an example of aspects of the transceiver 1435 described with reference to FIG. 14.

UE time indication manager 1115 may be an example of aspects of the UE time indication manager 1415 described with reference to FIG. 14.

UE time indication manager 1115 may receive a first encoded message during a first transmission time, the first encoded message including a TB cyclically shifted a first bit length. UE time indication manager 1115 may receive a second encoded message during a second transmission time, the second encoded message including the TB cyclically shifted a second bit length. UE time indication manager 1115 may identify a relative time distance between the first transmission time and the second transmission time. UE time indication manager 1115 may identify the difference between the first bit length and the second bit length based on the identifier relative time distance.

The UE time indication manager 1115 may also obtain a decoded TB that is cyclically shifted a first bit length, the TB including an information component and an error detection code. UE time indication manager 1115 may perform an error detection procedure on the TB by reverse cyclically shifting the TB for each of one or more other bit lengths. UE time indication manager 1115 may and identify the first bit length based on the error detection procedure passing for the first bit length.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may include a single antenna, or it may include a set of antennas.

Figure 12:
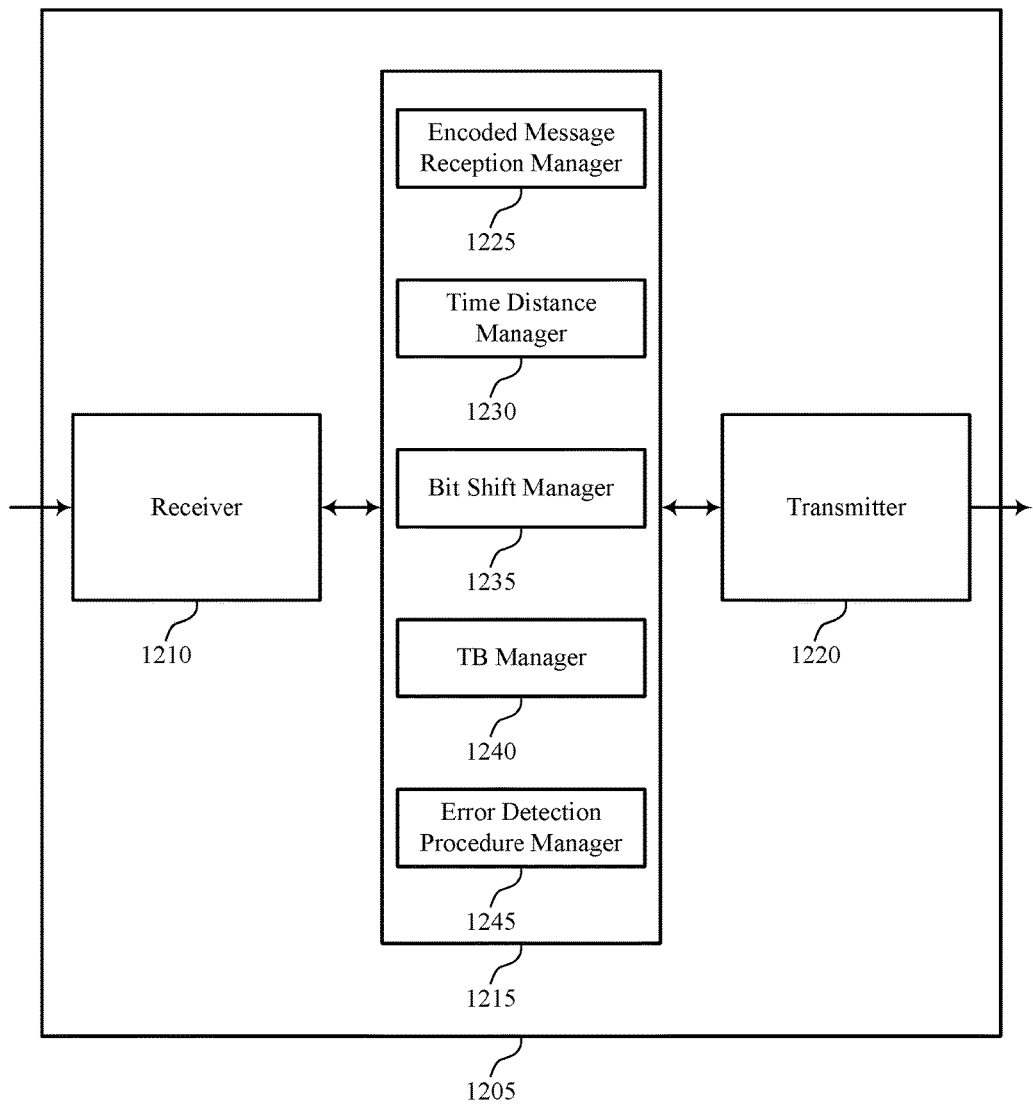

FIG. 12 shows a block diagram 1200 of a wireless device 1205 that supports communicating information plus an indication of transmission time, in accordance with one or more aspects of the present disclosure. Wireless device 1205 may be an example of aspects of a wireless device 1105 or a UE 115 as described with reference to FIGS. 1 through 6 and 11. Wireless device 1205 may include a receiver 1210, a UE time indication manager 1215, and a transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to communicating information plus an indication of transmission time, etc.). Information may be passed on to other components of the device. The receiver 1210 may be an example of aspects of the transceiver 1435 described with reference to FIG. 14.

UE time indication manager 1215 may be an example of aspects of the UE time indication manager 1415 described with reference to FIG. 14.

UE time indication manager 1215 may also include an encoded message reception manager 1225, a time distance manager 1230, a bit shift manager 1235, a TB manager 1240, and an error detection procedure manager 1245.

Encoded message reception manager 1225 may receive a first encoded message during a first transmission time, the first encoded message including a TB cyclically shifted a first bit length. Encoded message reception manager 1225 may receive a second encoded message during a second transmission time, the second encoded message including the TB cyclically shifted a second bit length. In some cases, a transmission time includes at least one of a symbol index or a subframe number.

Time distance manager 1230 may identify a relative time distance between the first transmission time and the second transmission time.

Bit shift manager 1235 may identify the difference between the first bit length and the second bit length based on the identifier relative time distance. Bit shift manager 1235 may align an encoded TB of the first message with an encoded TB of the second message using the identified difference between the first bit length and the second bit length. Bit shift manager 1235 may decode the bit aligned encoded TBs. Bit shift manager 1235 may align the encoded TB of the first message with the encoded TB of the second message that includes removing a relative cyclic shift between the encoded TBs. Bit shift manager 1235 may align decision metrics associated with an encoded TB of the first message with decision metrics associated with an encoded TB of the second message using the identified difference between the first bit length and the second bit length. Bit shift manager 1235 may combine the aligned one or more decision metrics, decode the combined decision metrics to obtain a decoded TB. Bit shift manager 1235 may identify the first bit length based on the error detection procedure passing for the first bit length, and use the identified first bit length to determine an associated transmission time.

TB manager 1240 may obtain a decoded TB that is cyclically shifted a first bit length, the TB including an information component and an error detection code. TB manager 1240 may determine that one or more bits of the TB of the second message are different from the corresponding bits of the TB of the first message. In some cases, the one or more bits are located at a preconfigured location of the TB. In some cases, the TB includes a system information TB.

Error detection procedure manager 1245 may perform an error detection procedure on the TB using one or more other cyclic shift bit lengths. Error detection procedure manager 1245 may identify a transmission time associated with the first encoded message based on the error detection procedure passing for the first bit length. Error detection procedure manager 1245 may perform an error detection procedure on the TB by reverse cyclically shifting the TB for each of one or more other bit lengths. Error detection procedure manager 1245 may determine that the error detection procedure passes for at least two of the one or more other bit lengths and discard the decoded TB. Error detection procedure manager 1245 may identify the at least two of the one or more other bit lengths as candidate bit lengths. In some cases, the error detection code includes a CRC. In some cases, the error detection procedure includes at least one of reverse-permuting the error detection code, de-interleaving the error detection code, or descrambling the error detection code.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may include a single antenna, or it may include a set of antennas.

Figure 13:
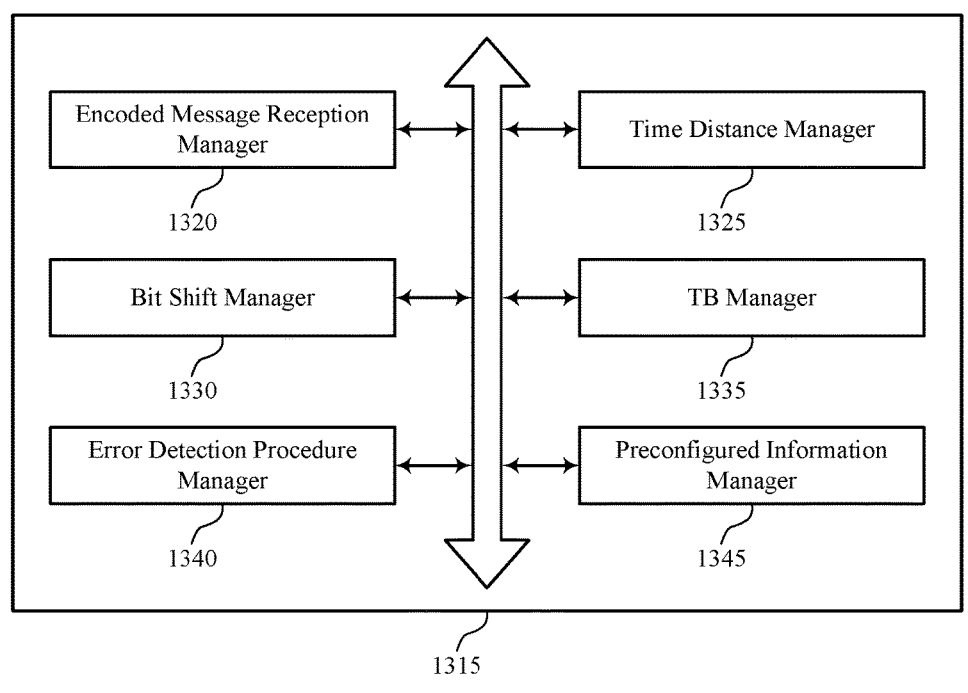

FIG. 13 shows a block diagram 1300 of a UE time indication manager 1315 that supports communicating information plus an indication of transmission time, in accordance with one or more aspects of the present disclosure. The UE time indication manager 1315 may be an example of aspects of a UE time indication manager 1415 described with reference to FIGS. 11, 12, and 14. The UE time indication manager 1315 may include encoded message reception manager 1320, time distance manager 1325, bit shift manager 1330, TB manager 1335, error detection procedure manager 1340, and preconfigured information manager 1345. Each of these modules may communicate, directly or indirectly, with one another (e.g., via one or more buses).

Encoded message reception manager 1320 may receive a first encoded message during a first transmission time, the first encoded message including a TB cyclically shifted a first bit length and receive a second encoded message during a second transmission time, the second encoded message including the TB cyclically shifted a second bit length. In some cases, a transmission time includes at least one of a symbol index or a subframe number.

Time distance manager 1325 may identify a relative time distance between the first transmission time and the second transmission time.

Bit shift manager 1330 may identify the difference between the first bit length and the second bit length based on the identifier relative time distance. Bit shift manager 1330 may align an encoded TB of the first message with an encoded TB of the second message using the identified difference between the first bit length and the second bit length and decode the bit aligned encoded TBs. Bit shift manager 1330 may align the encoded TB of the first message with the encoded TB of the second message that includes removing a relative cyclic shift between the encoded TBs. Bit shift manager 1330 may align decision metrics associated with an encoded TB of the first message with decision metrics associated with an encoded TB of the second message using the identified difference between the first bit length and the second bit length. Bit shift manager 1330 may combine the aligned one or more decision metrics, decode the combined decision metrics to obtain a decoded TB, identify the first bit length based on the error detection procedure passing for the first bit length, and use the identified first bit length to determine an associated transmission time.

TB manager 1335 may obtain a decoded TB that is cyclically shifted a first bit length, the TB including an information component and an error detection code. TB manager 1335 may determine that one or more bits of the TB of the second message are different from the corresponding bits of the TB of the first message. In some cases, the one or more bits are located at a preconfigured location of the TB. In some cases, the TB includes a system information TB.

Error detection procedure manager 1340 may perform an error detection procedure on the TB using one or more other cyclic shift bit lengths. Error detection procedure manager 1340 may identify a transmission time associated with the first encoded message based on the error detection procedure passing for the first bit length. Error detection procedure manager 1340 may perform an error detection procedure on the TB by reverse cyclically shifting the TB for each of one or more other bit lengths, determine that the error detection procedure passes for at least two of the one or more other bit lengths, and discard the decoded TB. Error detection procedure manager 1340 may identify the at least two of the one or more other bit lengths as candidate bit lengths. In some cases, the error detection code includes a CRC. In some cases, the error detection procedure includes at least one of reverse-permuting the error detection code, de-interleaving the error detection code, or descrambling the error detection code.

Preconfigured information manager 1345 may access preconfigured information to identify the first bit length from the candidate bit lengths.

Figure 14:
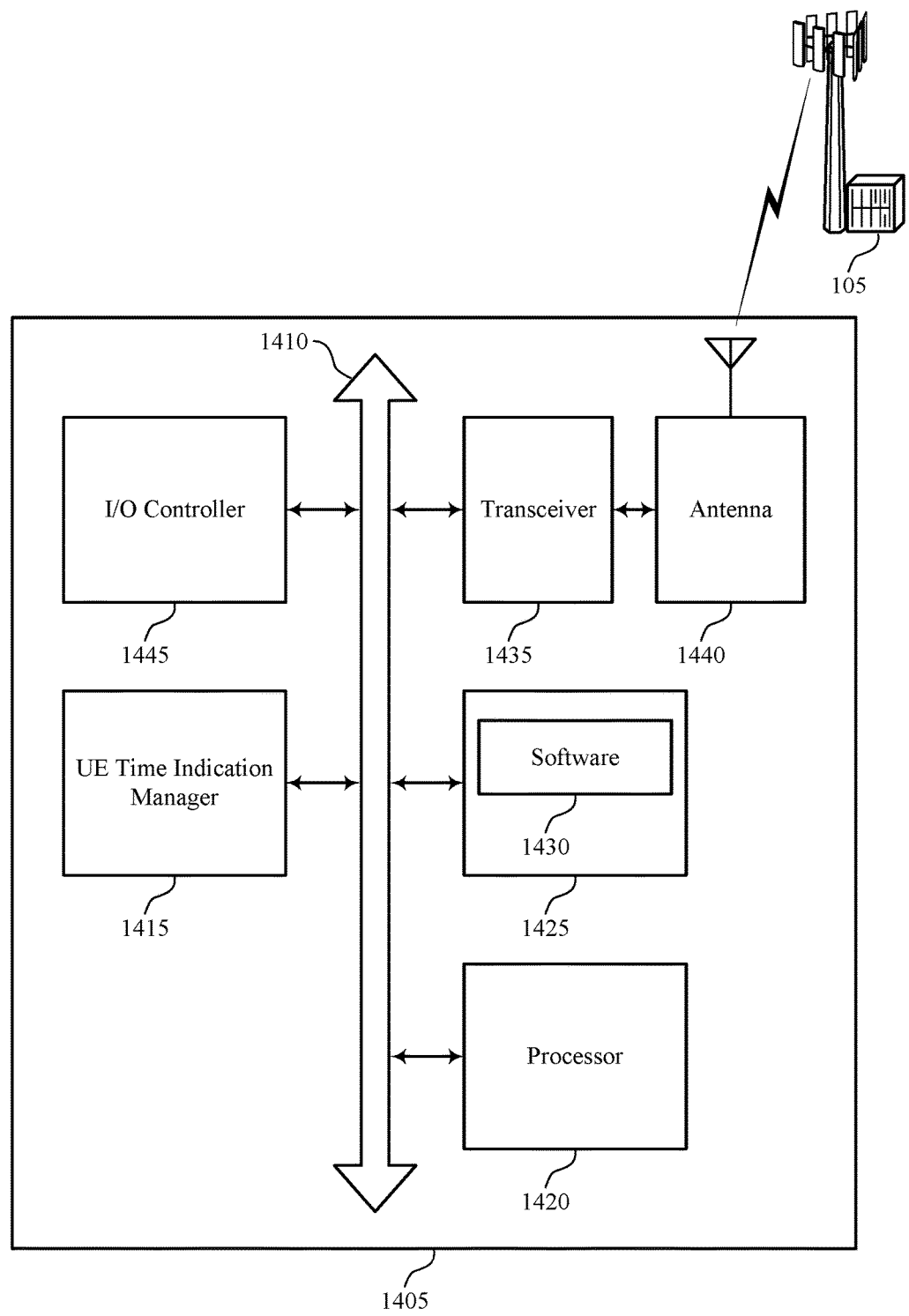
FIG. 14 illustrates a block diagram of a system including a UE that supports communicating information plus an indication of transmission time, in accordance with one or more aspects of the present disclosure.

FIG. 14 shows a diagram of a system 1400 including a device 1405 that supports communicating information plus an indication of transmission time, in accordance with one or more aspects of the present disclosure. Device 1405 may be an example of or include the components of UE 115 as described above, e.g., with reference to FIGS. 1 through 6. Device 1405 may include components for bi-directional voice and data communications including components for transmitting and receiving communications, including a UE time indication manager 1415, a processor 1420, a memory 1425, a software 1430, a transceiver 1435, an antenna 1440, and an I/O controller 1445. These components may be in electronic communication via one or more busses (e.g., bus 1410). Device 1405 may communicate wirelessly with one or more base stations 105.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting communicating information plus an indication of transmission time).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware and/or software operation such as the interaction with peripheral components or devices.

Software 1430 may include code to implement aspects of the present disclosure, including code to support communicating information plus an indication of transmission time. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

I/O controller 1445 may manage input and output signals for device 1405. I/O controller 1445 may also manage peripherals not integrated into device 1405. In some cases, I/O controller 1445 may represent a physical connection or port to an external peripheral. In some cases, I/O controller 1445 may utilize an operating system such as iOS®, ANDROID®, MS-DOS®, MS-WINDOWS®, OS/2®, UNIX®, LINUX®, or another known operating system.

Figure 15:
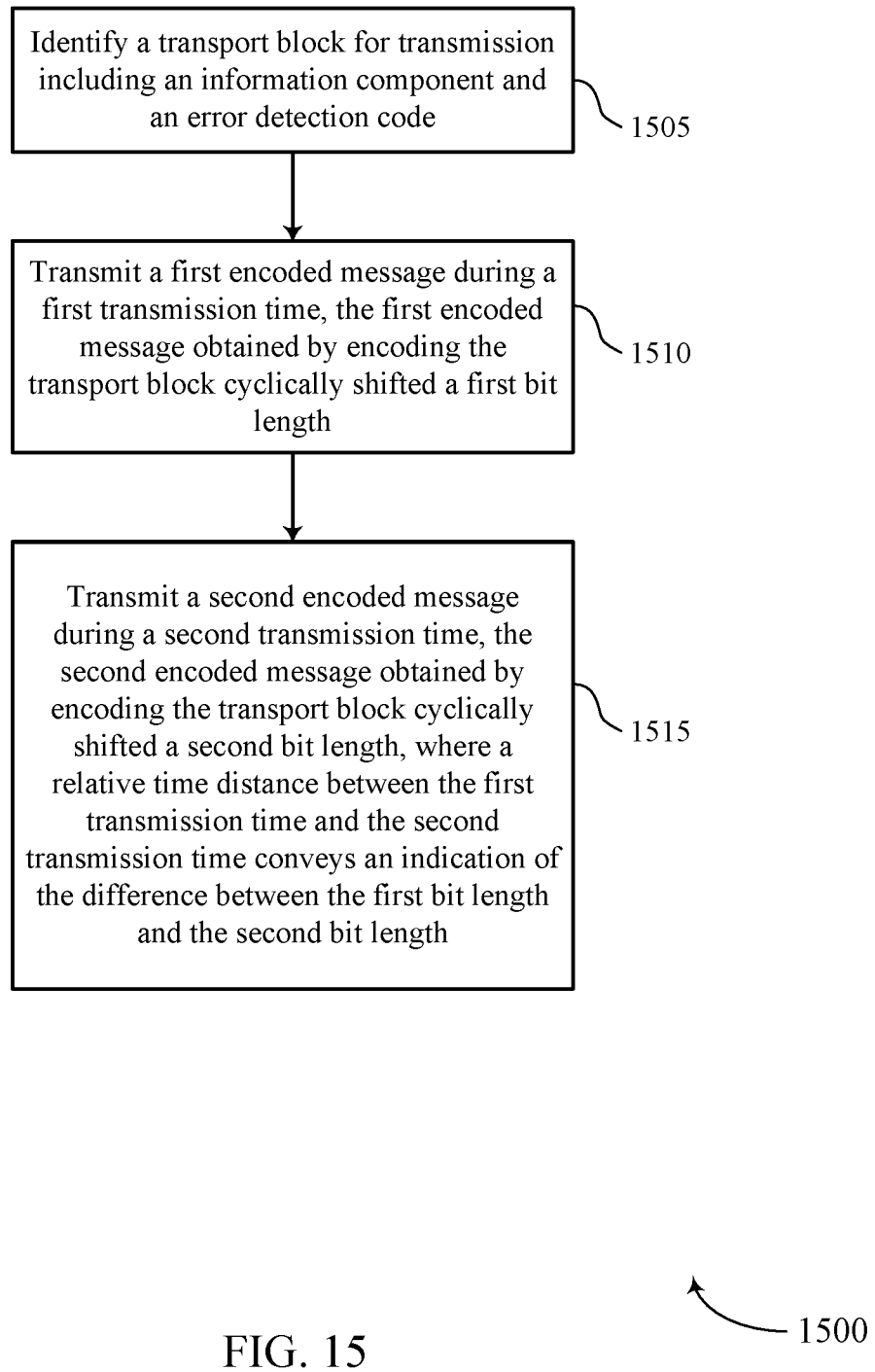
FIGS. 15 through 19 illustrate methods for communicating information plus an indication of transmission time, in accordance with one or more aspects of the present disclosure.

FIG. 15 shows a flowchart illustrating a method 1500 for communicating information plus an indication of transmission time, in accordance with one or more aspects of the present disclosure. The operations of method 1500 may be implemented by a base station 105 (such as a base station 105) or its components as described herein. For example, the operations of method 1500 may be performed by a base station time indication manager as described with reference to FIGS. 7 through 10. In some examples, a base station 105 may execute a set of codes to control the functional elements of the device to perform the functions described below. Additionally or alternatively, the base station 105 may perform aspects the functions described below using special-purpose hardware.

At block 1505 the base station 105 may identify a TB for transmission comprising an information component and an error detection code. The operations of block 1505 may be performed according to the methods described with reference to FIGS. 1 through 6. In certain examples, aspects of the operations of block 1505 may be performed by a TB manager as described with reference to FIGS. 7 through 10.

At block 1510 the base station 105 may transmit a first encoded message during a first transmission time, the first encoded message obtained by encoding the TB cyclically shifted a first bit length. The operations of block 1510 may be performed according to the methods described with reference to FIGS. 1 through 6. In certain examples, aspects of the operations of block 1510 may be performed by a encoded message transmission manager as described with reference to FIGS. 7 through 10.

At block 1515 the base station 105 may transmit a second encoded message during a second transmission time, the second encoded message obtained by encoding the TB cyclically shifted a second bit length, wherein a relative time distance between the first transmission time and the second transmission time conveys an indication of the difference between the first bit length and the second bit length. The operations of block 1515 may be performed according to the methods described with reference to FIGS. 1 through 6. In certain examples, aspects of the operations of block 1515 may be performed by a encoded message transmission manager as described with reference to FIGS. 7 through 10.

Figure 16:
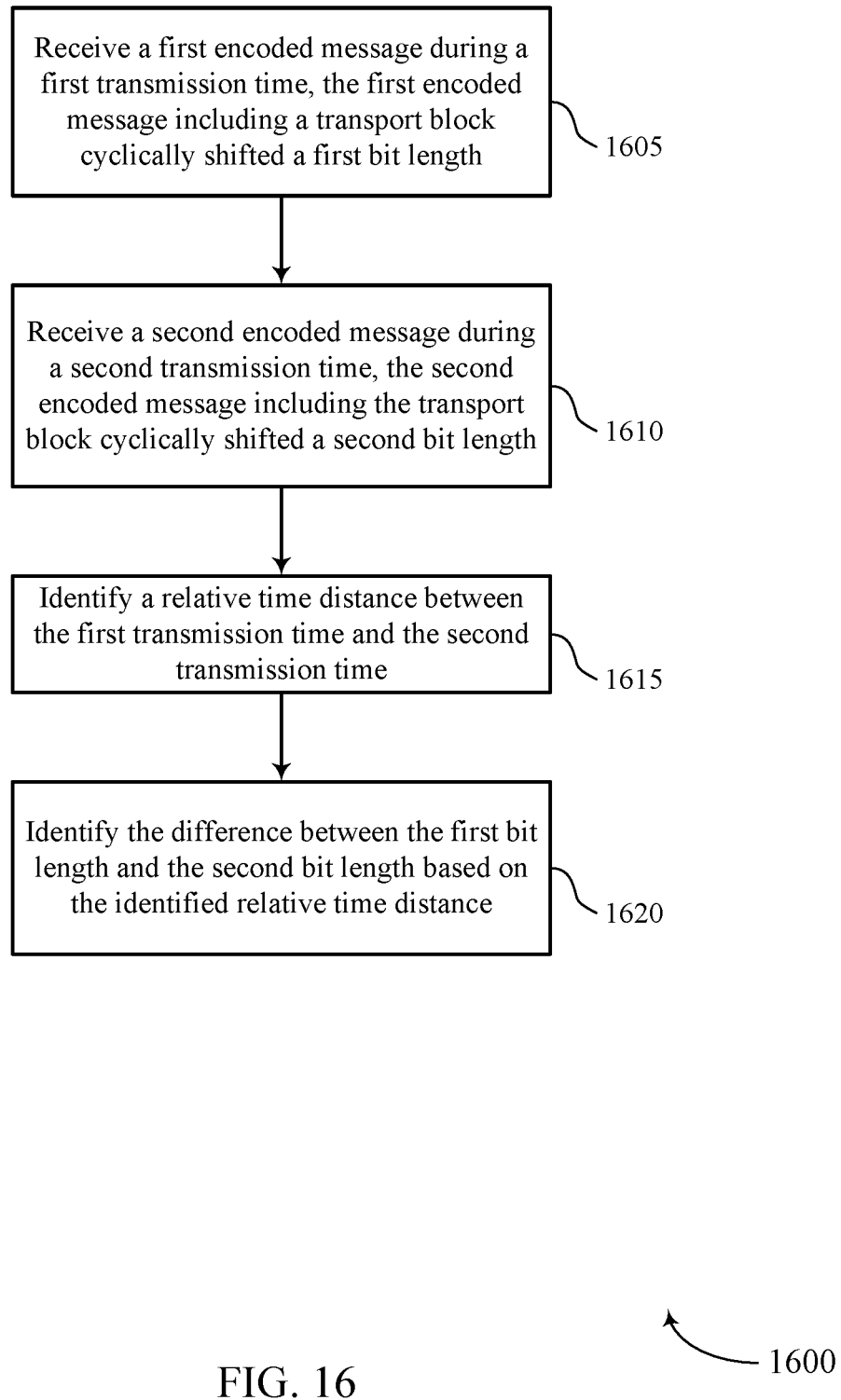

FIG. 16 shows a flowchart illustrating a method 1600 for communicating information plus an indication of transmission time, in accordance with one or more aspects of the present disclosure. The operations of method 1600 may be implemented by a UE 115 or its components as described herein. For example, the operations of method 1600 may be performed by a UE time indication manager as described with reference to FIGS. 11 through 14. In some examples, a UE 115 may execute a set of codes to control the functional elements of the device to perform the functions described below. Additionally or alternatively, the UE 115 may perform aspects the functions described below using special-purpose hardware.

At block 1605 the UE 115 may receive a first encoded message during a first transmission time, the first encoded message comprising a TB cyclically shifted a first bit length. The operations of block 1605 may be performed according to the methods described with reference to FIGS. 1 through 6. In certain examples, aspects of the operations of block 1605 may be performed by a encoded message reception manager as described with reference to FIGS. 11 through 14.

At block 1610 the UE 115 may receive a second encoded message during a second transmission time, the second encoded message comprising the TB cyclically shifted a second bit length. The operations of block 1610 may be performed according to the methods described with reference to FIGS. 1 through 6. In certain examples, aspects of the operations of block 1610 may be performed by a encoded message reception manager as described with reference to FIGS. 11 through 14.

At block 1615 the UE 115 may identify a relative time distance between the first transmission time and the second transmission time. The operations of block 1615 may be performed according to the methods described with reference to FIGS. 1 through 6. In certain examples, aspects of the operations of block 1615 may be performed by a time distance manager as described with reference to FIGS. 11 through 14.

At block 1620 the UE 115 may identify the difference between the first bit length and the second bit length based at least in part on the identified relative time distance. The operations of block 1620 may be performed according to the methods described with reference to FIGS. 1 through 6. In certain examples, aspects of the operations of block 1620 may be performed by a bit shift manager as described with reference to FIGS. 11 through 14.

Figure 17:
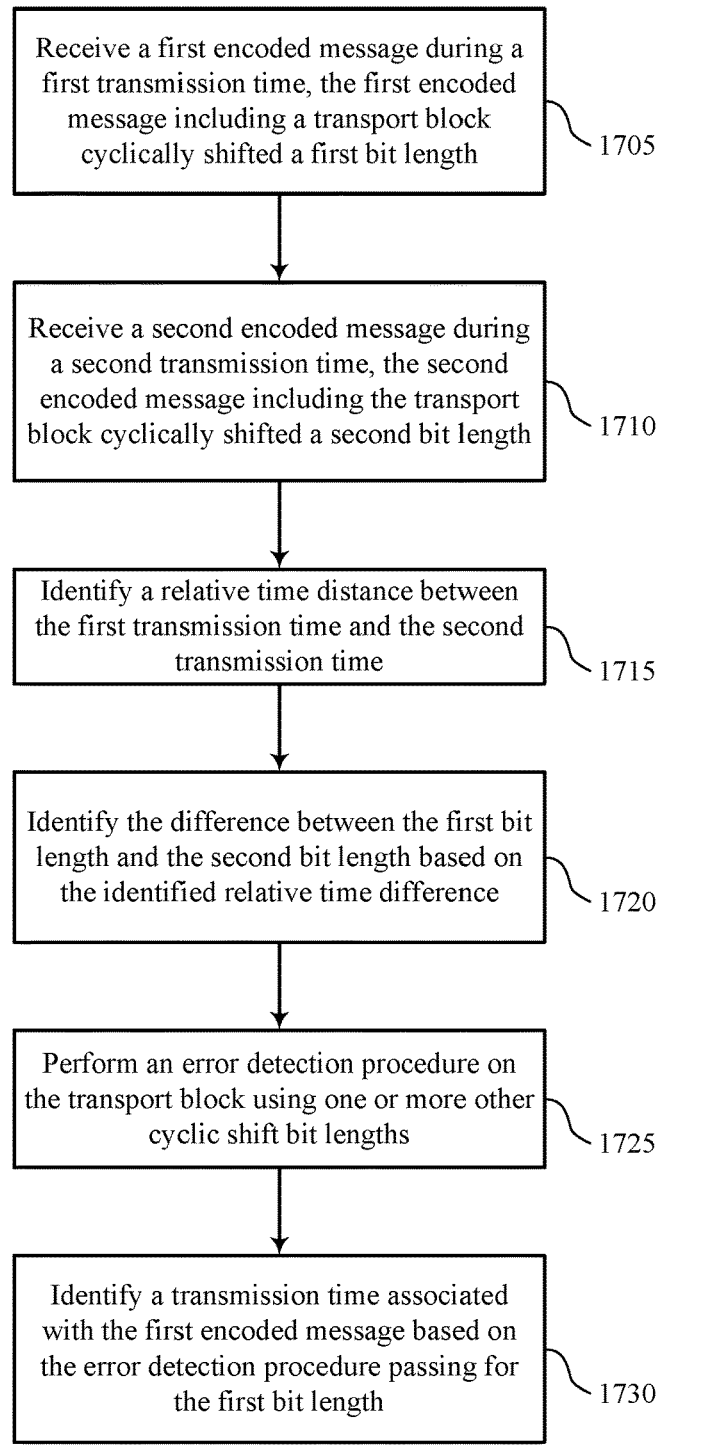

FIG. 17 shows a flowchart illustrating a method 1700 for communicating information plus an indication of transmission time, in accordance with one or more aspects of the present disclosure. The operations of method 1700 may be implemented by a UE 115 or its components as described herein. For example, the operations of method 1700 may be performed by a UE time indication manager as described with reference to FIGS. 11 through 14. In some examples, a UE 115 may execute a set of codes to control the functional elements of the device to perform the functions described below. Additionally or alternatively, the UE 115 may perform aspects the functions described below using special-purpose hardware.

At block 1705 the UE 115 may receive a first encoded message during a first transmission time, the first encoded message comprising a TB cyclically shifted a first bit length. The operations of block 1705 may be performed according to the methods described with reference to FIGS. 1 through 6. In certain examples, aspects of the operations of block 1705 may be performed by a encoded message reception manager as described with reference to FIGS. 11 through 14.

At block 1710 the UE 115 may receive a second encoded message during a second transmission time, the second encoded message comprising the TB cyclically shifted a second bit length. The operations of block 1710 may be performed according to the methods described with reference to FIGS. 1 through 6. In certain examples, aspects of the operations of block 1710 may be performed by a encoded message reception manager as described with reference to FIGS. 11 through 14.

At block 1715 the UE 115 may identify a relative time distance between the first transmission time and the second transmission time. The operations of block 1715 may be performed according to the methods described with reference to FIGS. 1 through 6. In certain examples, aspects of the operations of block 1715 may be performed by a time distance manager as described with reference to FIGS. 11 through 14.

At block 1720 the UE 115 may identify the difference between the first bit length and the second bit length based at least in part on the identified relative time distance. The operations of block 1720 may be performed according to the methods described with reference to FIGS. 1 through 6. In certain examples, aspects of the operations of block 1720 may be performed by a bit shift manager as described with reference to FIGS. 11 through 14.

At block 1725 the UE 115 may perform an error detection procedure on the TB using one or more other cyclic shift bit lengths. The operations of block 1725 may be performed according to the methods described with reference to FIGS. 1 through 6. In certain examples, aspects of the operations of block 1725 may be performed by an error detection procedure manager as described with reference to FIGS. 11 through 14.

At block 1730 the UE 115 may identify a transmission time associated with the first encoded message based at least in part on the error detection procedure passing for the first bit length. The operations of block 1730 may be performed according to the methods described with reference to FIGS. 1 through 6. In certain examples, aspects of the operations of block 1730 may be performed by an error detection procedure manager as described with reference to FIGS. 11 through 14.

Figure 18:
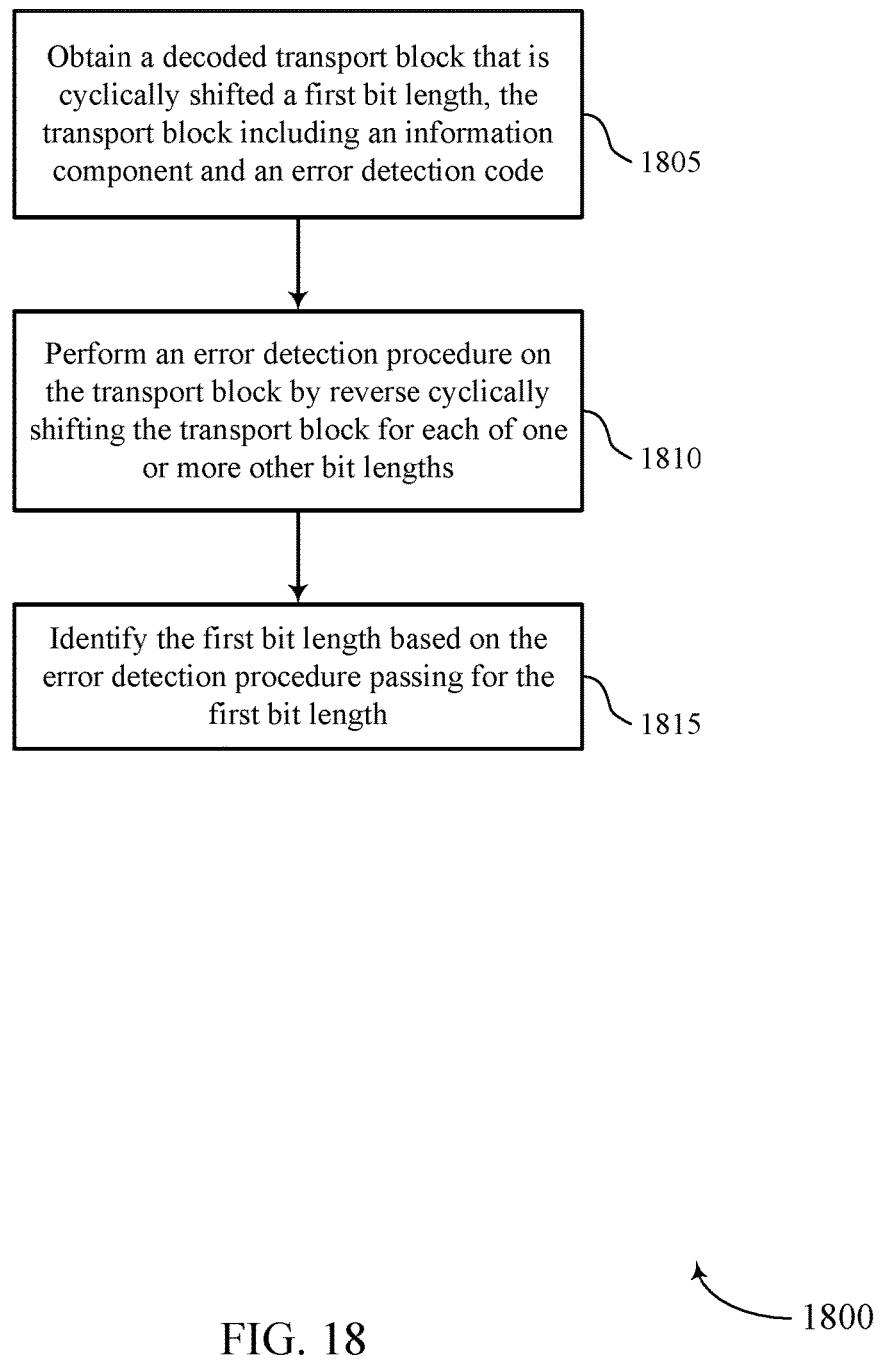

FIG. 18 shows a flowchart illustrating a method 1800 for communicating information plus an indication of transmission time, in accordance with one or more aspects of the present disclosure. The operations of method 1800 may be implemented by a UE 115 or its components as described herein. For example, the operations of method 1800 may be performed by a UE time indication manager as described with reference to FIGS. 11 through 14. In some examples, a UE 115 may execute a set of codes to control the functional elements of the device to perform the functions described below. Additionally or alternatively, the UE 115 may perform aspects the functions described below using special-purpose hardware.

At block 1805 the UE 115 may obtain a decoded TB that is cyclically shifted a first bit length, the TB comprising an information component and an error detection code. The operations of block 1805 may be performed according to the methods described with reference to FIGS. 1 through 6. In certain examples, aspects of the operations of block 1805 may be performed by a TB manager as described with reference to FIGS. 11 through 14.

At block 1810 the UE 115 may perform an error detection procedure on the TB by reverse cyclically shifting the TB for each of one or more other bit lengths. The operations of block 1810 may be performed according to the methods described with reference to FIGS. 1 through 6. In certain examples, aspects of the operations of block 1810 may be performed by an error detection procedure manager as described with reference to FIGS. 11 through 14.

At block 1815 the UE 115 may identify the first bit length based at least in part on the error detection procedure passing for the first bit length. The operations of block 1815 may be performed according to the methods described with reference to FIGS. 1 through 6. In certain examples, aspects of the operations of block 1815 may be performed by a bit shift manager as described with reference to FIGS. 11 through 14.

Figure 19:
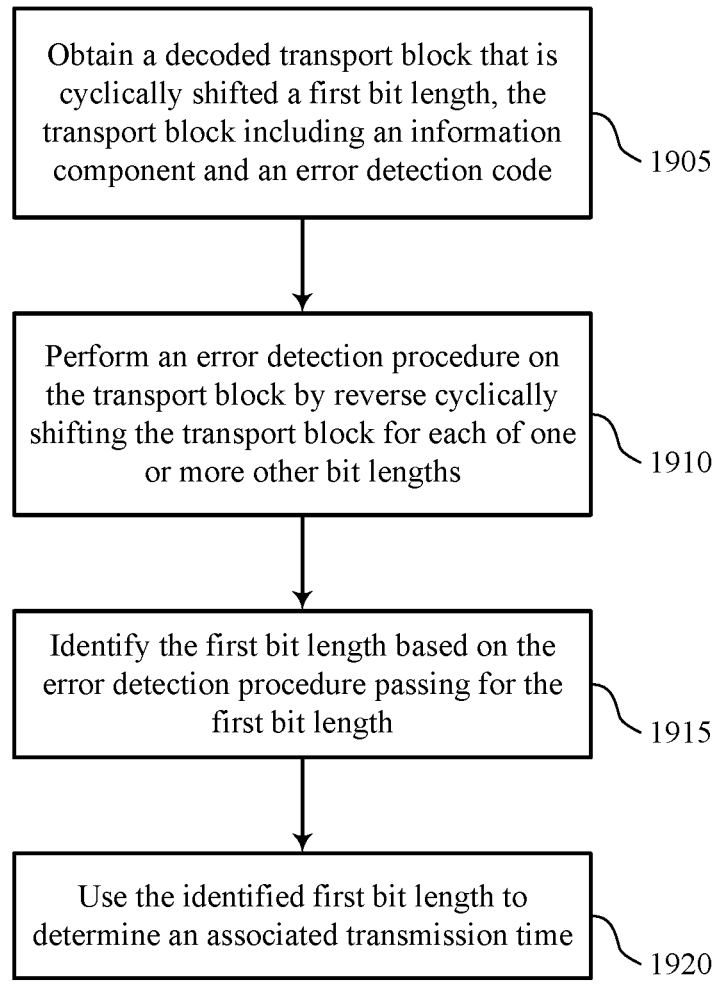

FIG. 19 shows a flowchart illustrating a method 1900 for communicating information plus an indication of transmission time, in accordance with one or more aspects of the present disclosure. The operations of method 1900 may be implemented by a UE 115 or its components as described herein. For example, the operations of method 1900 may be performed by a UE time indication manager as described with reference to FIGS. 11 through 14. In some examples, a UE 115 may execute a set of codes to control the functional elements of the device to perform the functions described below. Additionally or alternatively, the UE 115 may perform aspects the functions described below using special-purpose hardware.

At block 1905 the UE 115 may obtain a decoded TB that is cyclically shifted a first bit length, the TB comprising an information component and an error detection code. The operations of block 1905 may be performed according to the methods described with reference to FIGS. 1 through 6. In certain examples, aspects of the operations of block 1905 may be performed by a TB manager as described with reference to FIGS. 11 through 14.

At block 1910 the UE 115 may perform an error detection procedure on the TB by reverse cyclically shifting the TB for each of one or more other bit lengths. The operations of block 1910 may be performed according to the methods described with reference to FIGS. 1 through 6. In certain examples, aspects of the operations of block 1910 may be performed by an error detection procedure manager as described with reference to FIGS. 11 through 14.

At block 1915 the UE 115 may identify the first bit length based at least in part on the error detection procedure passing for the first bit length. The operations of block 1915 may be performed according to the methods described with reference to FIGS. 1 through 6. In certain examples, aspects of the operations of block 1915 may be performed by a bit shift manager as described with reference to FIGS. 11 through 14.

At block 1920 the UE 115 may use the identified first bit length to determine an associated transmission time. The operations of block 1920 may be performed according to the methods described with reference to FIGS. 1 through 6. In certain examples, aspects of the operations of block 1920 may be performed by a bit shift manager as described with reference to FIGS. 11 through 14.

It should be noted that the methods described above describe possible implementations, and that the operations may be rearranged or otherwise modified and that other implementations are possible. Furthermore, aspects from two or more of the methods may be combined.

Techniques described herein may be used for various wireless communication systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-Advanced (LTE-A) are releases of UMTS that use E-UTRA. UTRA, E-UTRA, UMTS, LTE, LTE-A, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term eNB may be generally used to describe the base stations. The wireless communication system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communication system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communication system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
identifying a transport block for transmission comprising an information component and an error detection code;
transmitting a first encoded message during a first transmission time, the first encoded message obtained by encoding the transport block cyclically shifted a first bit length; and
transmitting a second encoded message during a second transmission time, the second encoded message obtained by encoding the transport block cyclically shifted a second bit length, wherein a relative time distance between the first transmission time and the second transmission time conveys an indication of the difference between the first bit length and the second bit length.

2. The method of claim 1, further comprising:
selecting the first bit length is based at least in part on the first transmission time; and
selecting the second bit length is based at least in part on the second transmission time.

3. The method of claim 1, further comprising:
cyclically shifting the transport block; and
encoding the cyclically shifted transport block using a cyclic code.

4. The method of claim 1, further comprising:
encoding the transport block using a cyclic code; and
cyclically shifting the encoded transport block.

5. The method of claim 1, further comprising:
performing an error detection procedure on the transport block that has been cyclically shifted one or more other bit lengths; and
adjusting one or more reserved bits of the transport block until the error detection procedure fails for each of the one or more other bit lengths.

6. The method of claim 5, wherein
the one or more other bit lengths are associated with other available transmission times.

7. The method of claim 1, wherein
the information component comprises a system information component.

8. The method of claim 1, wherein
the transmission time comprises at least one of a symbol index or a subframe number.

9. The method of claim 1, wherein
the error detection code comprises a cyclic redundancy code.

10. The method of claim 1, wherein
the cyclically shifted first bit length and the cyclically shifted second bit length are shifted according to a circular shifting scheme.

11. The method of claim 1, wherein
the cyclically shifted first bit length conveys an indication of a first redundancy version index associated with the first encoded message, and
the cyclically shifted second bit length conveys an indication of a second redundancy version index associated with the second encoded message.

12. A method for wireless communication, comprising:
receiving a first encoded message during a first transmission time, the first encoded message comprising a transport block cyclically shifted a first bit length;
receiving a second encoded message during a second transmission time, the second encoded message comprising the transport block cyclically shifted a second bit length;
identifying a relative time distance between the first transmission time and the second transmission time; and
identifying the difference between the first bit length and the second bit length based at least in part on the identifier relative time distance.

13. The method of claim 12, further comprising:
aligning an encoded transport block of the first message with an encoded transport block of the second message using the identified difference between the first bit length and the second bit length; and
decoding the bit aligned encoded transport blocks.

14. The method of claim 13, further comprising:
aligning the encoded transport block of the first message with the encoded transport block of the second message comprises removing a relative cyclic shift between the encoded transport blocks.

15. The method of claim 12, further comprising:
aligning decision metrics associated with an encoded transport block of the first message with decision metrics associated with an encoded transport block of the second message using the identified difference between the first bit length and the second bit length;
combining the aligned one or more decision metrics; and
decoding the combined decision metrics to obtain a decoded transport block.

16. The method of claim 12, further comprising:
determining that one or more bits of the transport block of the second message are different from the corresponding bits of the transport block of the first message.

17. The method of claim 16, wherein
the one or more bits are located at a preconfigured location of the transport block.

18. The method of claim 12, wherein
the transport block comprises a system information transport block.

19. The method of claim 12, wherein
a transmission time comprises at least one of a symbol index or a subframe number.

20. The method of claim 12, further comprising:
performing an error detection procedure on the transport block using one or more other cyclic shift bit lengths; and
identifying a transmission time associated with the first encoded message based at least in part on the error detection procedure passing for the first bit length.

21. The method of claim 12, wherein
the error detection code comprises a cyclic redundancy code.

22. A method for wireless communication, comprising:
obtaining a decoded transport block that is cyclically shifted a first bit length, the transport block comprising an information component and an error detection code;
performing an error detection procedure on the transport block by reverse cyclically shifting the transport block for each of one or more other bit lengths;
identifying the first bit length based at least in part on the error detection procedure passing for the first bit length;
determining that the error detection procedure passes for at least two of the one or more other bit lengths;
identifying the at least two of the one or more other bit lengths as candidate bit lengths; and
accessing preconfigured information to identify the first bit length from the candidate bit lengths.

23. The method of claim 22, further comprising:
using the identified first bit length to determine an associated transmission time.

24. The method of claim 22, wherein
the error detection procedure comprises at least one of reverse-permuting the error detection code, de-interleaving the error detection code, or descrambling the error detection code.

25. The method of claim 22, further comprising:
discarding the decoded transport block.

26. An apparatus for wireless communication, comprising:
a processor;
memory in electronic communication with the processor; and
the processor and memory configured to:
identify a transport block for transmission comprising an information component and an error detection code;
transmit a first encoded message during a first transmission time, the first encoded message obtained by encoding the transport block cyclically shifted a first bit length; and
transmit a second encoded message during a second transmission time, the second encoded message obtained by encoding the transport block cyclically shifted a second bit length, wherein a relative time distance between the first transmission time and the second transmission time conveys an indication of the difference between the first bit length and the second bit length.

27. The apparatus of claim 26, wherein the processor and memory are further configured to:
cyclically shift the transport block; and
encode the cyclically shifted transport block using a cyclic code.

28. The apparatus of claim 26, wherein the processor and memory are further configured to:
encode the transport block using a cyclic code; and
cyclically shift the encoded transport block.

* * * * *